(12) United States Patent
Murata et al.

(10) Patent No.: US 6,404,881 B1
(45) Date of Patent: *Jun. 11, 2002

(54) EXCHANGE AND AN EXCHANGE SYSTEM IN A COMMUNICATION NETWORK

(75) Inventors: Shigeru Murata; Takamitsu Shirai, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,709

(22) Filed: Dec. 17, 1996

(30) Foreign Application Priority Data

Mar. 19, 1996  (JP) .............................................. 8-062669

(51) Int. Cl.⁷ .............................. H04M 3/42; H04M 7/00
(52) U.S. Cl. ....................... 379/225; 379/201; 379/219; 379/232; 379/234
(58) Field of Search ................................. 379/219, 201, 379/390, 391, 27, 60, 62, 32, 225, 232, 234, 377, 398, 399, 400, 207, 224, 266; 370/95.1, 95.3, 109, 321

(56) References Cited

U.S. PATENT DOCUMENTS

| | | | | |
|---|---|---|---|---|
| 4,464,543 A | * | 8/1984 | Kline et al. .................. | 340/734 |
| 4,488,004 A | * | 12/1984 | Bogart et al. ............. | 19/18 AD |
| 4,723,272 A | * | 2/1988 | Maat ........................... | 379/211 |
| 4,811,334 A | * | 3/1989 | Matt ............................ | 370/60 |
| 4,817,089 A | * | 3/1989 | Paneth et al. .................. | 370/95 |
| 4,887,293 A | * | 12/1989 | Molnar ........................ | 379/164 |
| 4,928,306 A | * | 5/1990 | Biswas et al. ............... | 379/201 |
| 5,018,195 A | * | 5/1991 | Hall ............................. | 379/225 |
| 5,121,391 A | * | 6/1992 | Paneth et al. ............... | 370/95.1 |
| 5,195,132 A | * | 3/1993 | Bowker et al. ............. | 379/410 |
| 5,206,902 A | * | 4/1993 | Bowker ....................... | 379/220 |
| 5,347,566 A | * | 9/1994 | Law et al. ..................... | 379/27 |
| 5,802,164 A | * | 9/1998 | Clancy et al. ............... | 379/347 |
| 5,805,692 A | * | 9/1998 | Oerlemans et al. ......... | 379/225 |
| 5,818,921 A | * | 10/1998 | Vander Meiden et al. .. | 379/225 |
| 5,963,621 A | * | 10/1999 | Demolitsas et al. ..... | 379/93.08 |

* cited by examiner

Primary Examiner—Allan Hoosain
(74) Attorney, Agent, or Firm—Rosenman & Colin LLP

(57) ABSTRACT

In an exchange including: a call processing unit for processing a call occuring at any one of plural subscriber lines, a main line, or a private line; a switch unit for establishing the call route determined by the call processing unit; and a plurality of trunks for separately connecting to any one of these lines; wherein the exchange comprises: a single or plural decision units for determining whether an audio frequency signal or line signal which separately indicates a state of change of level of the call signal, is received or not, in the route formed by these lines; and a single or plural variable units separately provided between each of routes and a corresponding port of the switch, and performing the change of the level based on the state indicated by the audio frequency signal or line signal which gives a result of decision by the decision unit, for the level of the call signal transmitted toward the route in which the result of the decision is true.

49 Claims, 12 Drawing Sheets

EXCHANGE AND AN EXCHANGE SYSTEM IN A COMMUNICATION NETWORK

BACKGROUND OF THE INVENTION

1. Field of the Invention

The present invention relates to an exchange and an exchange system in a communication network which is formed by a plurality of networks connected in series and each having different level diagram of a call signal (i.e., electrical level). In this case, a plurality of exchanges are provided at each end of the network, and the exchange system is formed by a plurality of relay lines each provided between exchanges.

2. Description of the Related Art

In a communication industry providing various services through public networks or private lines, there are many telephone companies that compete with each other on various services, for example, service of cost, quality of a call to be transmitted, and the like. In general, each telephone company has a private network which is adapted to its business strategy.

Further, almost companies have at least one branch exchange having high performance, and each company has private lines employing a compressed-coding transmission method between private branch exchanges, in order to save communication cost between a main office and a remote branch and to avoid many non-completed calls caused by busy state of the public network.

As a general structure, a private line is provided between private branch exchanges each of which is connected to the public network. Further, the public network is connected to a plurality of subscribers, and the other private branch exchange is connected to a plurality of extension lines within the company.

In this structure, an adjustment of the level of the call signal between the public network and the private line, or between exchanges is very important for realizing desirable high quality of the call. Particularly, in a long distance communication, there are many lines and exchanges between a sending side and a receiving side so that the quality of the call becomes worse. Accordingly, it is necessary to always improve the quality of calls in order to provide good service to the subscribers.

SUMMARY OF THE INVENTION

The primary object of the present invention is to provide an exchange enabling a high quality of calls.

Another object of the present invention is to provide an exchange system using the above exchanges enabling a high quality of calls.

Still another object of the present invention is to provide an exchange and an exchange system which can easily correct a very large or a very small level of the call signal to the normal level during a call.

In accordance with one aspect of the present invention, in an exchange including:

a call processing unit for processing a call from any one of plural subscriber lines, a main line, or a private line, selecting a communication route, identifying a completed call, and determining a call route to be used for transmitting a call signal;

a switch unit for establishing the call route determined by the call processing unit; and a plurality of trunks for separately connecting to any one of plural subscriber lines, a main line, or a private line, interfacing with the call route for the call signal, and having a matching between the call processing and a predetermined signal method used in any one of the plural subscriber lines, a main line, or a private line; wherein the exchange comprises:

a single or plural decision units for determining whether an audio frequency signal which separately indicates a state of change of level of the call signal, is received or not, in the route formed by all or any one of the plural subscriber lines, a main line, or a private line; and a single or plural variable units separately provided between each of the routes and a corresponding port of the switch, and performing the change of the level based on the state indicated by the audio frequency signal which gives a result of a decision by the decision unit, for the level of the call signal transmitted toward the route in which the result of the decision is true.

In accordance with another aspect of the present invention, in the same exchange as above: wherein the exchange comprises:

a single or plural decision units for determining whether an audio frequency signal which indicates a state of change of level of the call signal, is received or not, through the call route formed by the switch, in the route formed by all or any one of the plural subscriber lines, a main line, or a private line; and a single or plural variable units separately provided between each of opposite routes, which corresponds to the selected route based on selection of the route, and a corresponding port of the switch, and performing the change of the level based on the state indicated by the audio frequency signal which gives a result of a decision by the decision unit, for the level of the call signal transmitted toward the route in which the result of the decision is true.

In accordance with still another aspect of the present invention, in the same exchange as above: wherein the exchange comprises:

a single or plural decision units for determining whether a line signal which separately indicates a state of change of level of the call signal, is received or not, in the route formed by all or any one plural subscriber lines, a main line, or a private line; and a single or plural variable units separately provided between each of routes and a corresponding port of the switch, and performing the change of the level based on the state indicated by the line signal which gives a result of decision by the decision unit, for the level of the call signal transmitted toward the route in which the result of the decision is true.

In accordance with still another aspect of the present invention, in the same exchange as above: wherein the exchange comprises:

a single or plural decision units for determining whether an audio frequency signal which separately indicates a state of change of level of the call signal, is received or not, in the route formed by all or any one of plural subscriber lines, a main line, or a private line; and a single or plural variable units separately provided between each of opposite routes, which corresponds to the selected route based on selection of the route, and a corresponding port of the switch, and performing the change of the level based on a predetermined state, for the level of the call signal transmitted toward the route through the port;

wherein the call processing unit further includes a unit for giving the state to the variable means corresponding to the opposite route based on selection of the route, within a single or plural variable units, when the result of decision performed by a single or plural variable units is true.

In accordance with still another aspect of the present invention, in the same exchange as above: wherein the exchange comprises:.

a single or plural decision units for determining whether a line signal which separately indicates a state of change of level of the call signal, is received or not, in the route formed by all or any one of plural subscriber lines, a main line, or a private line, converting the line signal to the audio frequency signal, and transmitting the converted audio frequency signal to the call route; and a single or plural variable units separately provided between each of opposite routes, which can correspond to all routes based on selection of the route, and a corresponding port of the switch, and performing the change of the level based on a state indicated by the audio frequency signal, for the level of the call signal transmitted toward the route through the port.

In accordance with still another aspect of the present invention, in the same exchange as above: wherein the exchange comprises:

a single or plural decision units for determining whether a line signal which separately indicates a state of change of level of the call signal, is received or not, in the route formed by all or any one of plural subscriber lines, a main line, or a private line; and a single or plural variable units separately provided between each of opposite routes, which can correspond to all routes based on selection of the route, and a corresponding port of the switch, and performing the change of the level based on a predetermined state, for the level of the call signal transmitted toward the route formed by the switch;

wherein the call processing means further includes means for giving the result of decision, which is performed by the decision means, and the state to the variable means corresponding to the opposite route based on selection of the route, within a single or plural variable means.

In a preferred embodiment, the exchange further comprises a single or plural detecting units provided separately corresponding to the opposite route which can correspond to all routes through the call route based on selection of the route, and performing whether the audio frequency signal is received or not through the call route formed by the switch and the trunk connected to each route;

wherein a single or plural variable units further comprises a unit for limiting the change when the result of decision performed by the detecting unit which is provided to the opposite route based on selection of the route, within a single or plural detecting units.

In another preferred embodiment, the exchange further comprises a single or plural detecting units provided separately corresponding to the route, and performing whether the audio frequency signal is received or not through the route;

wherein a single or plural variable units further comprises a unit for limiting the change when the result of decision performed by the detecting unit which is provided to the route corresponding to the opposite route having the variable unit, under selection of the route, within a single or plural detecting units.

In accordance with still another aspect of the present invention, there is provided an exchange system including the above exchange and comprising:

the above exchange being used as a first exchange; and a second exchange connected to the first exchange through a relay line which corresponds to the main line or the private line, and exchanging the call on the relay line used as an incoming route or an outcoming route;

wherein the second exchange further comprises a signal conversion unit for indicating the state of the change for the level of the call signal to be transmitted toward any one of the subscriber lines, the main-line, or the private line, connected to its own exchange, supervising the line signal transmitted from any one of the subscriber lines, the main line, or the private line, converting the line signal to the audio frequency signal and transmitting the audio frequency signal to the relay line.

DESCRIPTION OF THE PREFERRED EMBODIMENTS

Figure 1:
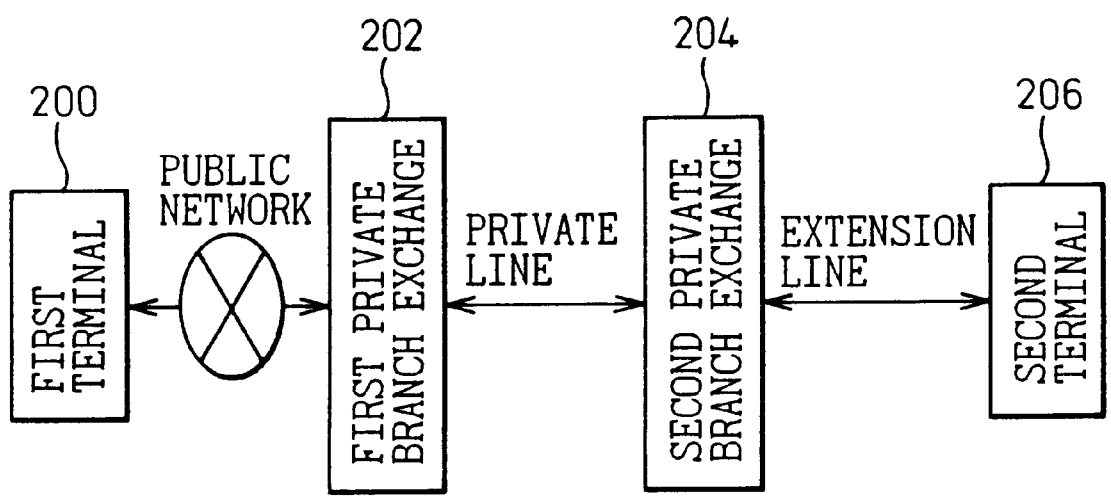
FIG. 1 shows a basic structure of an exchange system used in the present invention.

FIG. 1 shows a basic structure of an exchange system used in the present invention. In FIG. 1, reference number 200 a first terminal; 202 a first private branch exchange (or first exchange); 204 a second private branch exchange (or second exchange); and 206 a second terminal.

The first terminal 200, for example, a subscriber telephone, is connected to the public network which is connected to the first exchange 202. The first exchange 202 is connected to the second exchange 204 through the private line. The second exchange 204 is connected to the second terminal 206, for example, the extension telephone, through the extension line.

In an exchange system having above structure, when a sending call occurs in the first terminal 200, the sending call is transmitted to the first exchange 202 through the public network. Further, the sending call is transmitted from the first exchange 202 to the second exchange 204 through the private line.

The first and second exchanges 202 and 204 process the sending call in accordance with predetermined procedures (i.e., call processing). After completion of the call processing, the sending call is changed to a completion call so that a call route is established between the first terminal 200 and the second terminal 206.

When the call route is established, a call signal (i.e., up-call signal) is transmitted from the first terminal 200 to the second terminal 206 through the public network and the private line, and the other call signal (i.e., down-call signal) is returned from the second terminal 206 to the first terminal 200 through the private line and the public network.

In the private line between the first and second exchanges 202 and 204, the up-call/down-call signals are transmitted in accordance with a known compressed coding method applied to the first and second exchanges 202 and 204.

In this case, an actual level of the call signal is different in each call since the transmission loss of the public network is not constant due to a change of length (distance) of the transmission line in accordance with busy state of the call signal.

In a conventional art, the level diagram of the private line is determined based on a standard level diagram of the public network. However, this level diagram is not considered so as to adapt to the different level of the call signal as mentioned above. As a result, the difference of the level between the up-call signal and the down-call signal becomes very large.

Further, when the compressed-coding method is applied to the private line, the level of the call signal is not adjusted prior to the coding process. Accordingly, when the level of the call signal is very small, many portions of the dynamic range of the call signal which can be coded, are not effectively utilized. Still further, large quantizing errors occur when coding the call signal.

On the other hand, when the level of the call signal is very large, distortions of the waveform are overlapped in the vicinity of the peak portion of waveform of the call signal caused by limitation on amplitude in the coding process so that the quality of the transmission of the call signal became considerably worse.

Accordingly, the present invention aims to provide an exchange and exchange system which can easily correct very large or very small level of the call signal to the normal level during a call.

Figure 2:
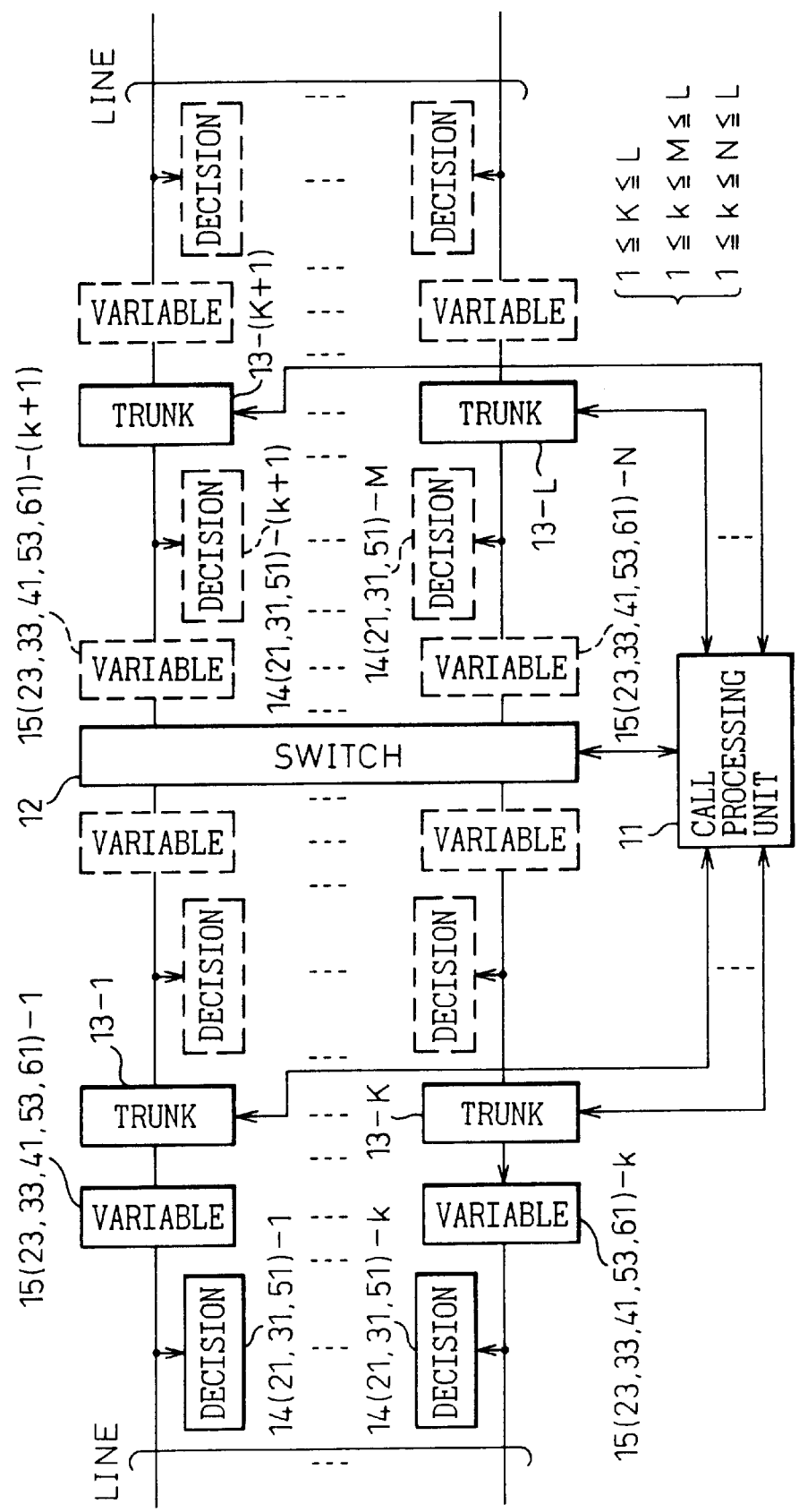
FIG. 2 shows a basic structure of an exchange according to the present invention.

FIG. 2 shows a basic structure of an exchange according to the present invention. This drawing corresponds to claims 1 to 6, 12, 15, and 17 to 19.

In the invention described in claim 1, in an exchange including;
    a call process unit 11 for processing a sending call occurring in any one of subscriber lines, main lines, or private lines (these are shown by LINE in the drawings), selecting the route in accordance with predetermined procedures and distinguishing the completion call based on selection of the route, and determining the call route for sending the call signal;
    a switch unit 12 for forming the call route determined by the call processing unit 11; and
    a plurality of trunks 13-1 to 13-L for interfacing with the call signal on the call route after connection to any one of subscriber lines, main lines, or private lines, and matching the call process with a signal method used in any one of these lines;
    the exchange is characterized in that it comprises;
    a single or plural decision units 14-1 to 14-M for determining whether an audio frequency signal which indicates separately a state of change of the level of the call signal, is received or not in the route formed by all or any one of these lines; and
    a single or plural variable units 15-1 to 15-N provided separately between each route and a corresponding port of the switch 12, and changing the level of the call signal transmitted to the route which a result of decision performed by the single or plural decision units 14-1 to 14-M is true, in accordance with the state indicated by the audio frequency signal giving the result of decision.

In the invention defined in claim 2, in the exchange including the same structure as above;
    the exchange is characterized in that it comprises;
    a single or plural decision units 21-1 to 21-M for determining whether an audio frequency signal which indicates a state of change of the level of the call signal, is received or not through the call route formed by the switch 12 in the route formed by all or any one of these lines; and
    a single or plural variable units 23-1 to 23-N provided separately between each opposite route based on selection of the route and a port corresponding to the opposite route of the switch 12, and changing the level of the call signal transmitted to the route which a result of decision performed by the single or plural decision units 21-1 to 21-M is truth, in accordance with the state indicated by the audio frequency signal giving the result of decision.

In the invention defined in claim 3, in the exchange including the same structure as above; the exchange is characterized in that it comprises:
    a single or plural decision units 31-1 to 31-M for determining whether a line signal which indicates separately a state of change of the level of the call signal, is received or not in the route formed by a part of or all of these lines; and
    a single or plural variable units 33-1 to 33-N provided separately between each route and a corresponding port of the switch 12, and changing the level of the call signal transmitted to the route which a result of decision performed by the single or plural decision units 31-1 to 31-M is true, in accordance with the state indicated by the line signal giving the result of decision.

In the invention defined in claim 4, in the exchange including the same structure as above; the exchange is characterized in that it comprises:
    a single or plural decision units 14-1 to 14-M for determining whether an audio frequency signal which indicates separately a state of change of the level of the call signal, is received or not in the route formed by a part of or all of these lines; and
    a single or plural variable units 41-1 to 41-N provided separately between each opposite route based on selection of the route and a port corresponding to the opposite route of the switch 12, and changing the level of the call signal transmitted to the call route through the port, in accordance with the state given,
    wherein the call processing unit 11 further includes means for giving the state to one of the variable units 41-1 to 41-N which corresponds to the opposite route based on selection of the route when the result of the decision performed by the single or plural decision units 14-1 to 14-N is true.

In the invention defined in claim 5, in the exchange including the same structure as above;

the exchange is characterized in that it comprises:

a single or plural decision units 51-1 to 51-M for determining whether a line signal which indicates separately a state of change of the level of the call signal, is received or not in the route formed by all or any one of these lines, further converting the received line signal to the audio frequency signal and transmitting the converted signal to the call route; and a single or plural variable units 53-1 to 53-N provided separately between each opposite route by route selection and a port corresponding to the opposite route of the switch 12, and changing the level of the call signal transmitted to the route formed by the switch 12, in accordance with the state indicated by the audio frequency signal.

In the invention defined in claim 6, in the exchange including the same structure as above; the exchange is characterized in that it comprises:

a single or plural decision units 31-1 to 31-M for determining whether a line signal which indicates separately a state of change of the level of the call signal, is received or not in the route formed by a part of or all of these lines; and a single or plural variable units 61-1 to 63-N provided separately between each opposite route based on selection of the route and a port corresponding to the opposite route of the switch 12, and changing the level of the call signal transmitted to the route formed by the switch 12;

wherein the call processing unit 11 further comprises means for designating the state and the result of decision performed by the single or plural decision units 31-1 to 31-M to one of variable units 61-1 to 61-N which corresponds to the opposite route based on selection of the route.

Figure 3:
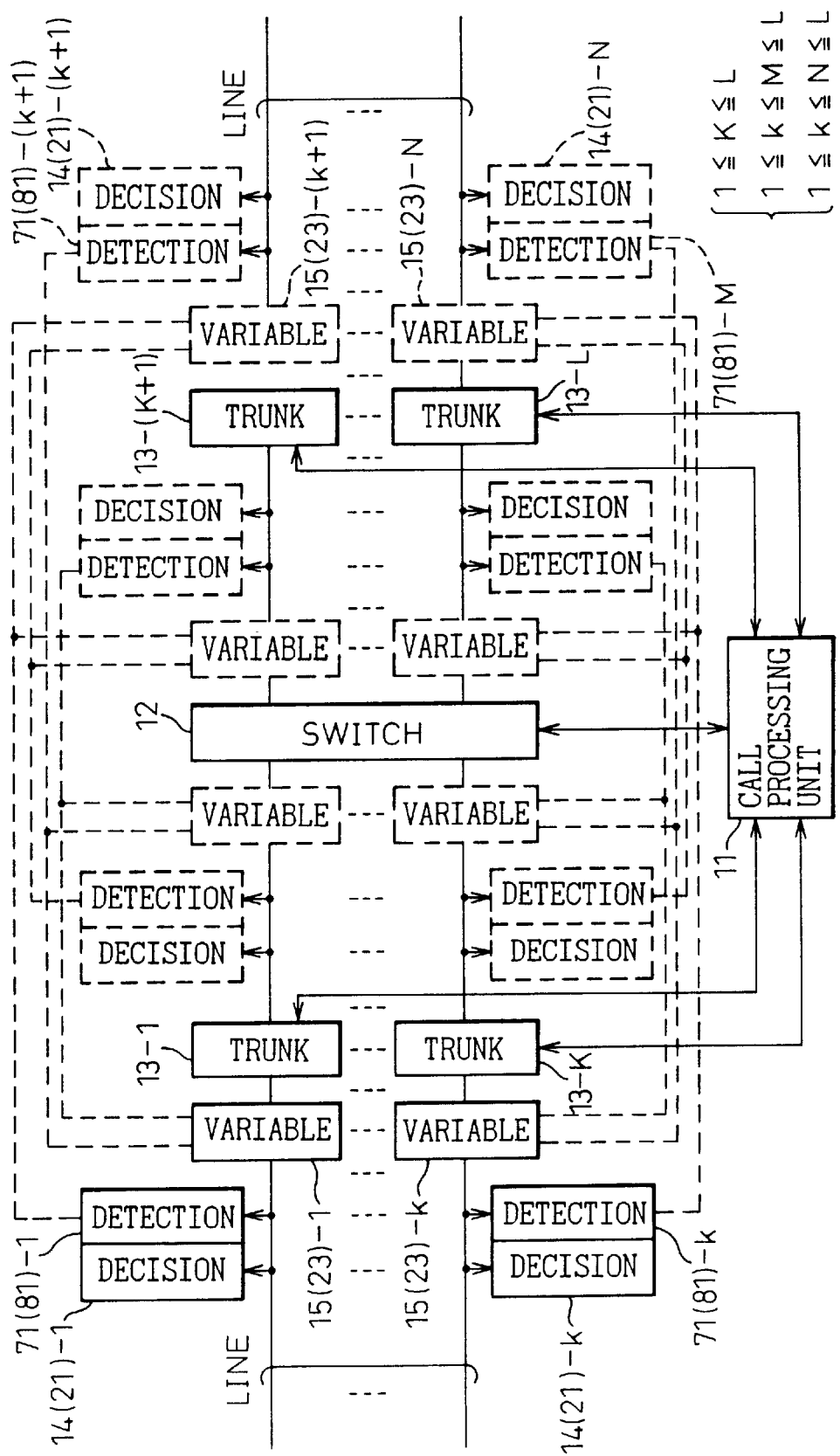
FIG. 3 shows another basic structure of an exchange according to the present invention.

FIG. 3 shows another basic structure of an exchange according to the present-invention. This drawing corresponds to claims 7, 8, 12, 15, and 17 to 19.

In the invention defined in claim 7, in an exchange described in claim 1, it further includes:

a single or plural detecting units 71-1 to 71-N provided corresponding to the opposite route which can be faced to all routes based on selection of the route through the call route, and determining whether the audio frequency signal is received or not, through the trunk connected to each route and the call route formed on the switch; and a change limiting unit provided in the variable unit for limiting the change when the result of the decision which is performed by the detecting unit provided on the opposite route based on selection of the route within a single or plural variable units.

In the invention defined in claim 8, in the exchange described in claim 2, it further includes:

a single or a plurality of detecting units 81-1 to 81-N provided corresponding to the route and determining whether the audio frequency signal is received or not through the route; and a change limiting unit provided in the variable unit for limiting the change when the result of the decision which is performed by the detecting unit provided on the opposite route which the variable unit is provided, based on selection of the route.

Figure 4:
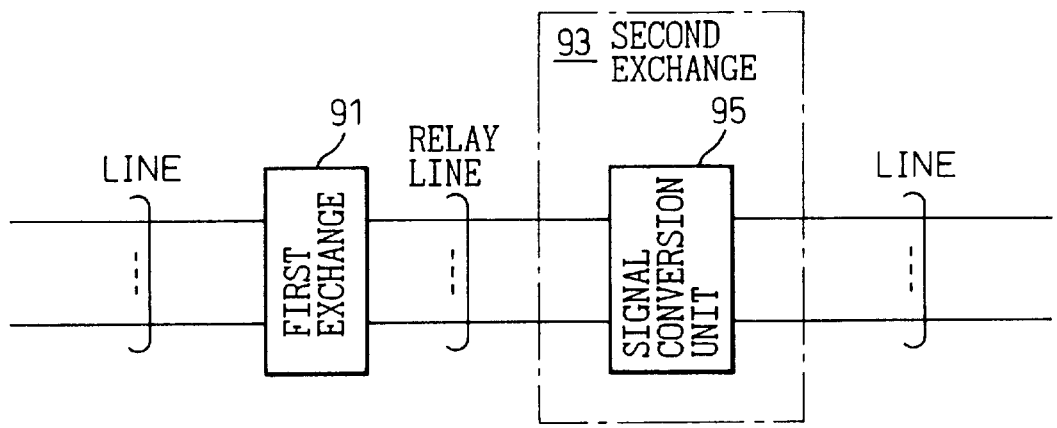
FIG. 4 shows still another basic structure of an exchange system according to the present invention.

FIG. 4 shows still another basic structure of an exchange system according to the present invention. This drawing corresponds to claims 9, 13, 16, and 20 to 22.

In the invention defined in claim 9, an exchange system includes: a first exchange 91 defined in any one of claims 1, 2, 4, 7 or 8; and a second exchange 93 connected to the first exchange through either the main line or the private line (i.e., relay line) for exchanging the call between incoming/outcoming routes of the relay line. Further, the second exchange 93 includes a signal conversion unit 95 which indicates a state of the change of the level of the call signal to be transmitted to any one of the subscriber line, the private line, or the main line, connected to its own exchange, supervises a line signal provided on any one of these lines, and transmits the line signal to the relay line after the line signal is converted to the audio frequency signal.

Figure 5:
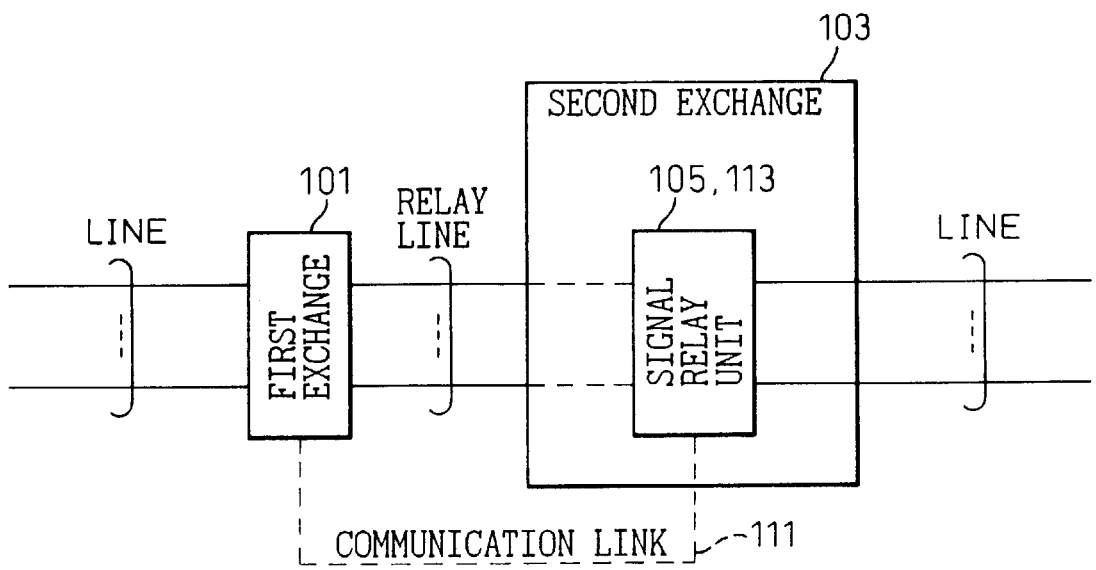
FIG. 5 shows still another basic structure of the exchange system according to the present invention.

FIG. 5 shows still another basic structure of the exchange system according to the present invention. This drawing corresponds to claims 10, 11, 16, and 20 to 22.

In the invention described in claim 10, an exchange system includes: a first exchange 101 defined in any one of claims 3, 5, or 6; and a second exchange 103 connected to the first exchange 101 through either the main line or the private line (i.e., relay line) for exchanging the call between the incoming/outcoming routes of the relay line. Further, the second exchange 103 includes a signal relay unit 105 which indicates a state of the change of the level of the call signal to be transmitted to any one of the subscriber line, the private line, or the main line, connected to its own exchange; supervises a line signal provided on any one of these lines; and relays the line signal to the first exchange 101 through the relay line.

In the invention defined in claim 11, an exchange system includes: a first exchange 101 defined in any one of claims 3, 5, or 6; and a second exchange 103 connected to the first exchange 101 through either the main line or the private line (i.e., relay line) for exchanging the call between the incoming/outcoming routes of the relay line. Further, a communication link 111 is provided between the first exchange 101 and the second exchange 103, and a known common channel signalling method is applied to the first and second exchanges.

Still further, the second exchange 103 includes a signal relay unit 113 which indicates a state of the change of the level of the call signal to be transmitted to any one of the subscriber line, the private line, or the main line, connected to its own exchange; supervises a line signal provided on any one of these lines; and relays the line signal with an identifying information through the communication link 111. Still further, the call processing unit of the first exchange 101 includes means for applying the line signal relayed with the identifying information, to the decision unit corresponding to the identifying information through the communication link 111.

In the invention defined in claim 12, in an exchange described in any one of claims 1, 2, 4, 7 or 8, the audio frequency signal is a register signal applied to a known signal method used in any one of the subscriber line, the main line, or the private line.

In the invention defined in claim 13, in the exchange system described in claim 9, the audio frequency signal is a register signal applied to the signal method used in any one of the subscriber line, the main line, or the private line.

Figure 6:
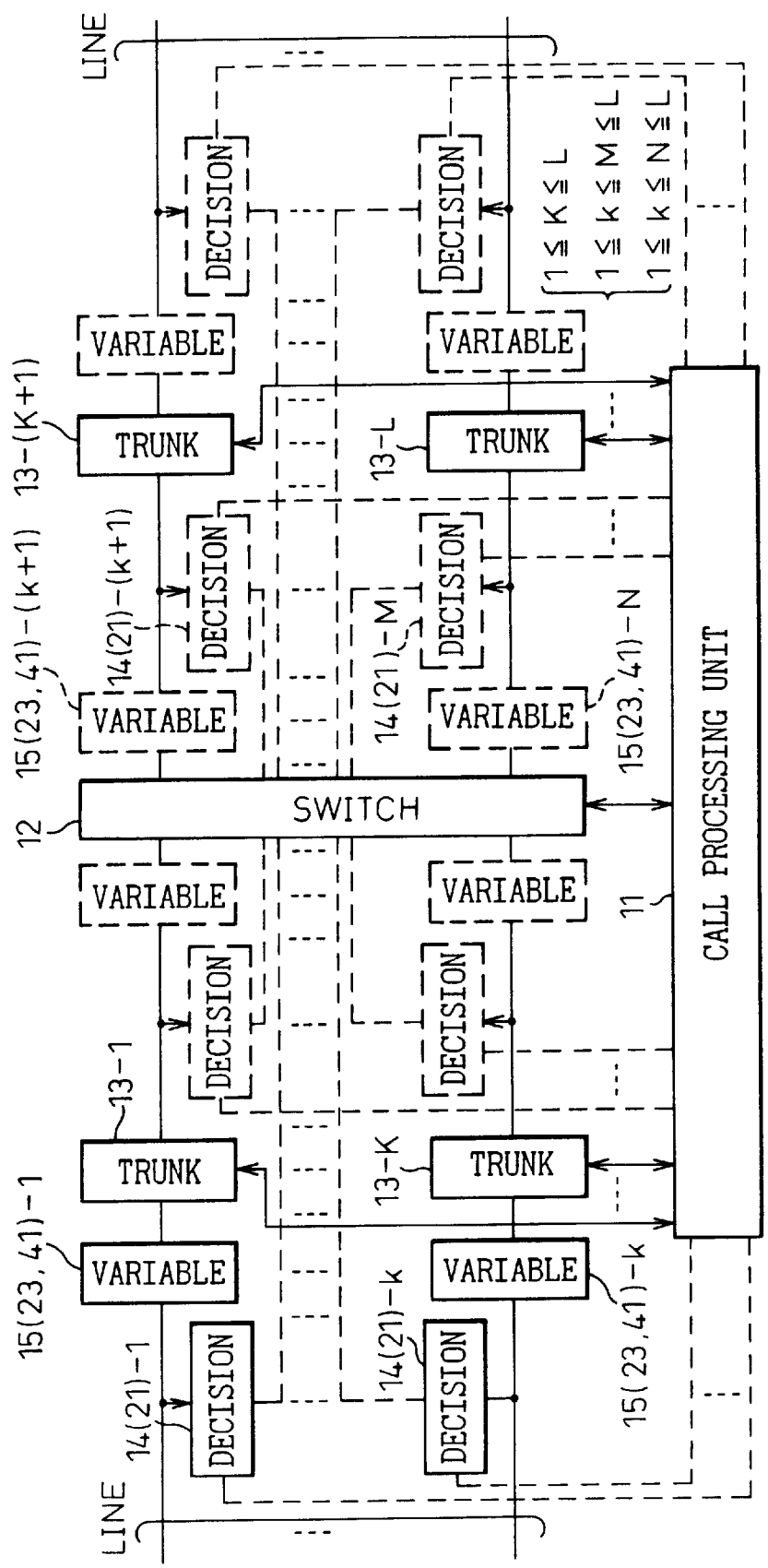
FIG. 6 shows still another basic structure of the exchange according to the present invention.

FIG. 6 shows still another basic structure of the exchange according to the present invention. This drawing corresponds to claims 14, 15, and 17 to 19.

In the invention defined in claim 14, in an exchange defined in any one of claims 1, 2, or 4, the audio frequency signal is the register signal applied to the signal method used in any one of the subscriber line, the main line, or the private line. The decision units 14-1 to 14-M and 21-1 to 21-M are a single or plural registers which are separately connected to the port of the switch 12, receive the register signal applied through the call route formed in the switch 12, and transmit the information indicated by the register signal to the call processing unit 11.

The call processing unit 11 includes means for detecting a vacant register within a single or plural registers when determining the call route, and requesting connection between the register and the call route to the switch 12. In this case, the switch 12 includes means for connecting between the register and the call route in accordance with the request.

In the invention defined in claim 15, in an exchange defined in any one of claims 1 to 8, 12, or 14, the compressed-coding method is applied to the main line and the private line. The variable unit converts the level of the call signal either before coding or after decoding based on the compressed-coding method.

In the invention defined in claim 16, in an exchange system defined in any one of claims 9 to 11, or 13, the compressed-coding method is applied to the main line and the private line. The variable unit converts the level of the call signal either before coding or after decoding based on the compressed-coding method.

In the invention defined in claim 17, in an exchange defined in any one of claims 1 to 8, 12, 14, or 15, the audio frequency signal or the line signal shows a state which changes the level of the call signal by stages in accordance with change the audio frequency signal or the line signal.

In the invention defined in claim 18, in an exchange defined in any one of claims 1 to 8, 12, 14, or 15, the audio frequency signal or the line signal shows a state which changes the level of the call signal in accordance with a relative value indicated by the audio frequency signal or the line signal.

In the invention defined in claim 19, in an exchange defined in any one of claims 1 to 8, 12, 14, or 15, the audio frequency signal or the line signal shows a state which sets the level of the call signal to an absolute value indicated by the audio frequency signal or the line signal.

In the invention defined in claim 20, in an exchange system defined in any one of claims 9 to 11, 13, or 16, the audio frequency signal or the line signal shows a state which changes the level of the call signal by stages in accordance with the change of the audio frequency signal or the line signal.

In the invention defined in claim 21, in an exchange system defined in any one of claims 9 to 11, 13, or 16, the audio frequency signal or the line signal shows a state which changes the level of the call signal in accordance with the relative value indicated by the audio frequency signal or the line signal.

In the invention described in claim 22, in an exchange described in any one of claims 9 to 11, 13, or 16, the audio frequency signal or the line signal shows a state which sets the level of the call signal to the absolute value indicated by the audio frequency signal or the line signal.

According to the exchange described in claim 1, the decision units 14-1 to 14-M determine whether the audio frequency signal which separately indicates the state of change of the level of the call signal, is received or not for the route which the completion call is identified by the call processing unit 11, within the routes formed by all or any one of plural subscriber lines, the main line, or the private line.

Further, the variable units 15-1 to 15-N performs the change based on the state indicated by the audio frequency signal which gives the result of the decision, for the level of the call signal transmitted to the route which the result of the decision performed by the decision means, is true within the routes formed by all or any one of plural subscriber lines, the main line, or the private line.

That is, since the deviation of the level of the call signal can be surely reduced in accordance with operation performed to the terminal during calling, it is possible to maintain the high quality of the call since a line loss which is different each call, can be compensated for.

According to the exchange described in claim 2, the decision units 21-1 to 21-M determines whether the audio frequency signal which indicates the state of change of the level of the call signal, is received or not through the call route separately formed by the switch 12, for the route which the call signal is identified by the call processing unit 11, within the routes formed by all or any one of plural subscriber lines, the main line, or the private line.

Further, the variable units 23-1 to 23-N perform the change based on the state indicated by the audio frequency signal which gives the result of the decision, for the level of the call signal transmitted to the route which the result of the decision performed by the decision units 21-1 to 21-M, is true within the routes formed by all or any one .of plural subscriber lines, the main line, or the private line.

Accordingly, if the variable units 23-1 to 23-N are separately provided between each route opposite to plural routes and the port of the switch 12 corresponding to the opposite route, it is possible to surely reduce the deviation of the level of the call signal as well as the invention defined in claim 1.

According to the exchange described in claim 3, the decision units 31-1 to 31-M determine whether the line signal which separately indicates the state of change of the level of the call signal, is received or not for the route which the completion call is identified by the call processing unit 11, within the routes formed by all or any one of plural subscriber lines, the main line, or the private line.

Further, the variable units 33-1 to 33-N perform the change based on the state indicated by the line signal which gives the result of the decision, for the level of the call signal transmitted to the route which the result of the decision performed by the decision units 31-1 to 31-M, is true within the routes formed by all or any one of plural subscriber lines, the main line, or the private line.

The line signal can be received through hardware which is the same structure as that mounted to the trunks 13-1 to 13-L, it is possible to surely reduce the deviation of the level of the call signal even if the terminal which requests the change of level of the call signal, cannot transmit the audio frequency signal.

According to the-exchange described in claim 4, the decision units 14-1 to 14-M determine whether the audio frequency signal which separately indicates the state of change of the level of the call signal, is received or not for the route which the completion call is identified by the call processing unit 11, within the routes formed by all or any one of plural subscriber lines, the main line, or the private line.

The call processing unit 11 gives the above-mentioned state to the route opposite to the route which the audio frequency signal is received, within the variable units 41-1 to 41-N when the audio frequency signal is received by the decision units 14-1 to 14-M.

Further, the variable units 41-1 to 41-N perform the change based on the state given by the call process unit 11 for the level of the call signal transmitted to the call route through the port of the switch 12.

That is, if the variable units 41-1 to 41-N are separately provided between each route opposite to plural routes and the port of the switch 12 corresponding to the opposite route, it is possible to surely reduce the deviation of the level of the call signal as well as the invention defined in claim 1.

According to the exchange described in claim 5, the decision units 51-1 to 51-M determine whether the line signal which separately indicates the state of change of the level of the call signal, is received or not for the route which the completion call is identified by the call processing unit 11, within the routes formed by all or any one of plural subscriber lines, the main line, or the private line.

Further, the decision units 51-1 to 51-M convert the received line signal to the audio frequency signal when the decision is true.

The variable units 53-1 to 53-M performs the change based on the state given by the call processing unit 11 for the level of the call signal transmitted to the call route when receiving the audio frequency signal transmitted from the decision unit 51-1 to 51-M through the call route formed by the switch 12.

That is, if the terminal which requests the change of the level of the call signal cannot transmit the audio frequency signal, it is possible to surely reduce the deviation of the level of the call signal since the request is transmitted to the variable units 53-1 to 53-N not through the call processing unit 11.

According to the exchange described in claim 6, the decision units 31-1 to 31-M determine whether the line signal which separately indicates the state of change of the level of the call signal, is received or not for the route which the completion call is identified by the call processing unit 11, within the routes formed by all or any one of plural subscriber lines, the main line, or the private line.

The call processing means 11 gives the above-mentioned state to the variable units 61-1 to 61-N corresponding to the route opposite to the route which the line signal is received, when the line signal is received by the decision units 31-1 to 31-M.

Further, the variable units 61-1 to 61-N perform the change based on the state given by the call processing unit 11 for the level of the call signal transmitted to the call route through the port of the switch 12.

Accordingly, even if means for receiving the audio frequency signal is not included within the decision units 31-1 to 31-M and the variable units 61-1 to 61-N, and even if the terminal which requests the change of the level of the call signal cannot transmit the audio frequency signal, it is possible to surely reduce deviation of the level of the call signal.

According to the exchange described in claim 7, in the exchange described in claim 1, the detection units 71-1 to 71-N determine whether the audio frequency signal is received or not through the trunk separately connected to plural routes and the call route formed to the switch.

Further, the variable units 15-1 to 15-N limits the change of the level of the call signal when the result of the decision performed in the detection unit which is provided to the opposite route based on selection of the route.

That is, the detection units 71-1 to 71-N are provided corresponding to the opposite route which faces for all call routes. Since whether the same audio frequency signal is received or not, is determined by the detection units 71-1 to 71-N and the decision units 14-1 to 14-M in both ends of the call route, it is possible to detect the completion call not through the call processing unit 11, and to reduce the deviation of the level of the call signal for the completion call.

According to the exchange described in claim 8, the decision units 21-1 to 21-M and the variable units 23-1 to 23-N are provided to the corresponding position through the call route formed to the switch 12. The detection units 81-1 to 81-N are provided to the position corresponding the route. In this case, the operations of decision units 21-1 to 21-M, the variable units 23-1 to 23-N and the detection units 81-1 to 81-N are omitted since the operations of these units are the same as that of the invention described in claim 7.

Accordingly, it is possible to surely reduce the deviation of the level of the call signal as well as the exchange described in claim 7.

According to the exchange system described in claim 9, in the second exchange 93, the signal conversion unit 95 indicates the state of change for the level of the call signal to be transmitted to any one of the subscriber line, the main line, or the private line, connected to its own exchange, and supervises the line signal applied through any one of the subscriber line, the main line, or the private line, and transmits the line signal to the relay line after conversion to the audio frequency signal.

The first exchange 91 corresponds to any one of the exchanges described in claims 1, 2, 4, 7, or 8, and the operation of the exchange was explained above.

That is, since the line signal is converted to the audio frequency signal in the second exchange 93, if the terminal which requests the change of the level of the call signal cannot transmit the audio frequency signal, or if the second exchange 93 cannot receive the audio frequency signal, the request is transmitted to the first exchange 91, and the level of the call signal can be changed.

According to the exchange system described in claim 10, in the second exchange 103, the signal conversion unit 95 indicates the state of change for the level of the call signal to be transmitted to any one of the subscriber line, the main line, or the private line, connected to its own exchange, and supervises the line signal applied through any one of the subscriber line, the main line, or the private line, and relays the line signal to the first exchange 101 through the relay line.

The first exchange 101 corresponds to any one of the exchanges described in claims 3, 5, or 6, and the operation of the exchange was explained above.

That is, if the terminal which requests the change of the level of the call signal cannot transmit the audio frequency signal, or if the first exchange 101 and the second exchange 103 cannot receive the audio frequency signal, the request is transmitted to the first exchange 101, and the level of the call signal can be changed.

According to the exchange system described in claim 11, in the second exchange 103, the signal relay unit 113 indicates the state of change for the level of the call signal to be transmitted to any one of the subscriber line, the main line, or the private line, connected to its own exchange, and supervises the line signal applied through any one of the subscriber line, the main line, or the private line, and relays the line signal through the communication link 111 with the identifying information indicating the relay line.

The first exchange 101 corresponds to any one of the exchanges described in claims 3, 5, or 6, and the operation of the exchange was explained above.

That is, if the terminal which requests the change of the level of the call signal cannot transmit the audio frequency signal, or if the first exchange 101 and the second exchange 103 cannot receive the audio frequency signal, the request is transmitted to the first exchange 101, and the level of the call signal can be changed.

According to the exchange described in claim 12, in the exchange described in claims 1, 2, 4, 7, or 8, the audio frequency signal corresponds to the register signal applying the signal method used in any one of the subscriber line, the main line, or the private line.

Accordingly, it is possible to surely identify the request of change of the level of the call signal as the register signal by applying a known technique.

According to the exchange system described in claim 13, in the exchange system described in claim 9, the audio frequency signal corresponds to the register signal employing the signal method used in any one of the subscriber line, the main line, or the private line.

Accordingly, it is possible to surely identify the request for change of the level of the call signal as the register signal by applying a known technique.

According to the exchange described in claim 14, in the exchange described in any one of claims 1, 2, or 4, the audio frequency signal corresponds to the register signal employing the signal method used in any one of the subscriber line, the main line, or the private line. The decision units 14-1 to 14-M and 21-1 to 21-M are separately connected to the port of the switch 12. The call process unit 11 detects the vacant register when determining the call route, within a single or plural registers which can receive the register signal through the call route formed to the switch 12, and requests connection between the register and the call route to the switch 12. The switch 12 connects between the register and the call route in accordance with the request.

That is, it is possible to simplify the structure of the hardware since the request of the change of the level of the call signal is given based on the known signal method.

According to the exchange described in claim 15, in the exchange described in any one of claims 1 to 8, 12, or 14, the compressed-coding method is applied to the main line or the private line. The variable unit changes the level of the call signal before coding or after decoding based on the known compressed-coding method.

That is, since the call signal is transmitted through the main line or the private line after the deviation of the level of the call signal is compressed, the dynamic range of the main line and the private line can be effectively utilized so that it is possible to improve a signal-to-noise (S/N) ratio of the call signal.

According to the exchange described in claim 16, in the exchange system described in any one of claims 9 to 11, or 13, the compressed-coding method is applied to the main line or the private line. The variable unit changes the level of the call signal before coding or after decoding based on the compressed-coding method.

That is, since the call signal is transmitted to the opposite exchange through the main line or the private line after the deviation of the level of the call signal is compressed, the dynamic range of the main line and the private line can be effectively utilized so that it is possible to improve the signal-to-noise (S/N) ratio of the call signal.

According to the exchange described in claim 17, in the exchange described in any one of claims 1 to 8, 12, 14, or 15, the audio frequency signal or the line signal shows the state which changes the level of the call signal by stage.

Accordingly, the correction which is flexibly applied to the deviation of the level of the call signal, is performed in accordance with the simple operation which gives the direction to be increased/decreased for the level of the call signal.

According to the exchange described in claim 18, in the exchange described in any one of claims 1 to 8, 12, 14, or 15, the audio frequency signal or the line signal shows the state which changes the level of the call signal based on the relative value indicated by the audio frequency signal or the line signal.

That is, since the deviation is corrected in accordance with the operation which applies the direction to be increased/decreased and the width of increment/decrement of the level of the call signal, it is possible to improve the quality of the call even if the absolute value of the deviation is large.

According to the exchange described in claim 19, in the exchange described in any one of claims 1 to 8, 12, 14, or 15, the audio frequency signal or the line signal shows the state which sets the level of the call signal to the absolute value indicated by the audio frequency signal or the line signal.

That is, since the level of the call signal is set to the above absolute value regardless the deviation which occurs in actuality, it is possible to effectively improve the quality of the call as well as the exchange defined in claim 18, and to surely determine a reference of evaluation for the quality of signal transmission which is requested in an actual maintenance and working.

According to the exchange described in claim 20, in the exchange system described in any one of claims 9 to 11, 13, or 16, the audio frequency signal or the line signal shows the state which changes the level of the call signal in accordance with the audio frequency signal or the line signal.

Accordingly, the correction which is flexibly applied to the deviation of the level of the call signal, is performed in accordance with the simple operation which gives the direction to be increased/decreased for the level of the call signal.

According to the exchange described in claim 21, in the exchange system described in any one of claims 9 to 11, 13, or 16, the audio frequency signal or the line signal shows the state which changes the level of the call signal based on the absolute value indicated by the audio frequency signal or the line signal.

That is, since the deviation is corrected in accordance with the operation which applies the direction to be increased/decreased and the width of increment/decrement of the level of the call signal, it is possible to improve the quality of call when an absolute value of the deviation is large.

According to the exchange described in claim 22, in the exchange system described in any one of claims 9 to 11, 13, or 16, the audio frequency signal or the line signal shows the state which sets the level of the call signal to the absolute value indicated by the audio frequency signal or the line signal.

That is, since the level of the call signal is set to the above absolute value regardless the deviation which occurs in actuality, it is possible to effectively improve the quality of the call as well as the exchange defined in claim 21, and to surely obtain the reference of evaluation for the quality of the signal transmission which is requested in actual maintenance and working.

The following explanations are given to various embodiments according to the present invention.

Figure 7:
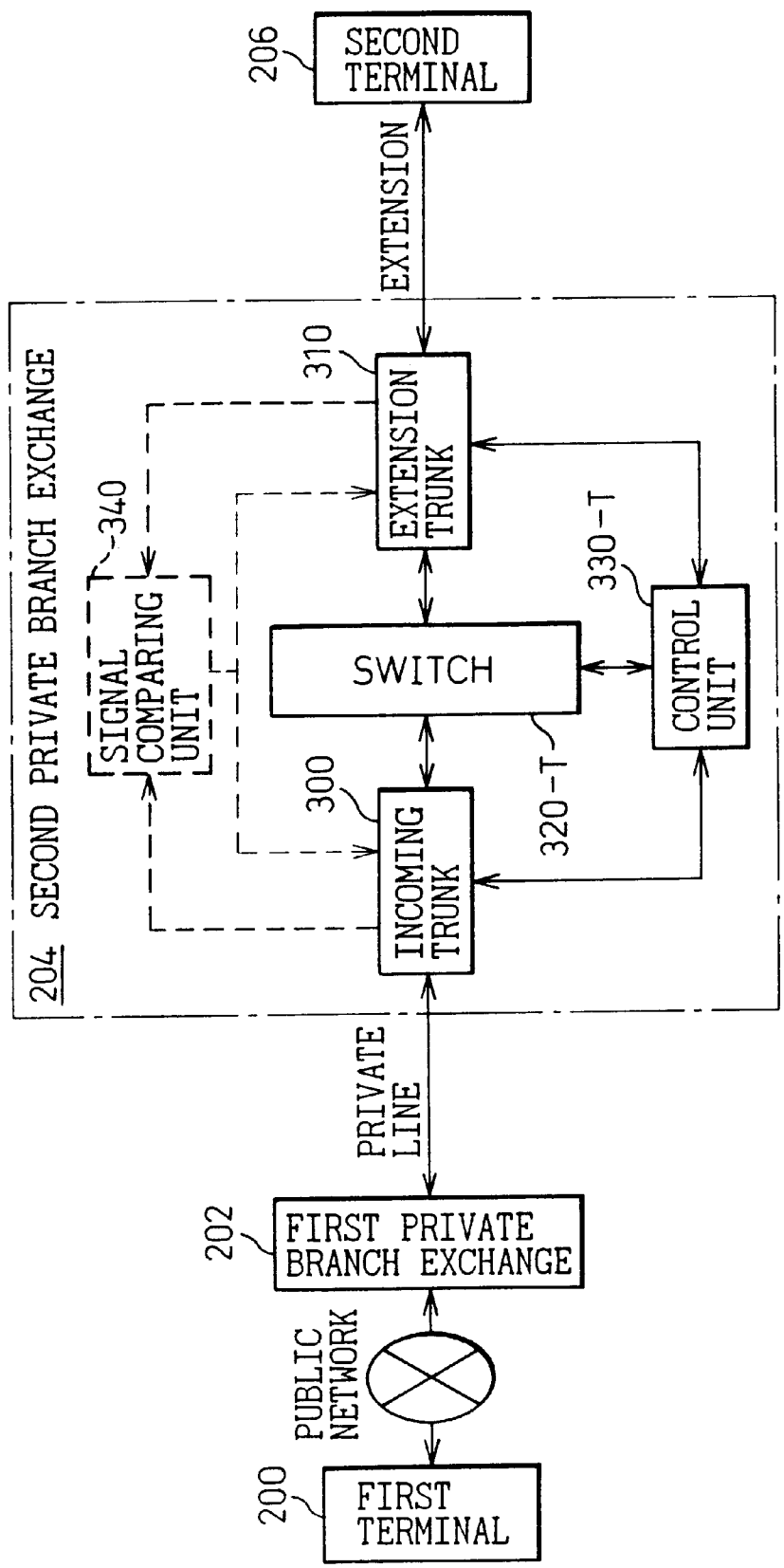
FIG. 7 is a schematic block diagram of a first embodiment according to the present invention.

FIG. 7 is a schematic block diagram of a first embodiment according to the present invention. This drawing corresponds to claims 1 to 8, 12, 14, 15, and 17 to 19.

Although this structure is basically the same as the structure of FIG. 1, the structure of the second exchange is shown in detail. In the second exchange 204, reference number 300 denotes an incoming trunk, 310 an extension trunk, 320-T a switch, 330-T a control unit, and 340 a signal comparing unit.

As shown in the drawing, the incoming trunk 300 is connected to the private line, and the extension trunk 310 is connected to the second terminal 206 through the extension line. Further, the incoming trunk 300 and the extension trunk 310-T are connected to the corresponding port of the switch 320-T, and connected to the control unit 330-T through the communication link. The switch 320--T is also connected to the control unit 330-T.

In this structure, the control unit 330-T corresponds to the call processing unit 11, the switch 320-T corresponds to the switch 12, and the incoming trunk 300 and the extension trunk 310 correspond to the trunks 13-1 to 13-L, the decision units 14-1 to 14-M, 21-1 to 21-M, 31-1 to 31-M, 51-1 to 51-M and the variable units 15-1 to 15-N, 23-1 to 23-N, 33-1 to 33-N, 41-1 to 41-N, 53-1 to 53-N and 61-1 to 61-N, in FIGS. 1 and 5.

The operation of this structure is explained in detail below.

In the second private branch exchange 204, the control unit 330-T generates state information indicating that an incoming call occurred in the second terminal 206 is changed to the completion call, and the control unit 330-T transmits the state information to the extension trunk 310.

When the extension trunk 310 receives the state information, the extension trunk 310 supervises the down-call signal transmitted from the second terminal 206, and determines whether it is a multi-frequency signal (below, change requesting signal) indicating that the level of the up-call signal should be changed in accordance with the level of the down-call signal.

Further, when the result of the decision is true, the extension trunk 310 instructs the correction of the level of the up-call signal to an inner amplifier (not shown). The inner amplifier automatically controls its gain, and maintains the level of the up-call signal to a predetermined normal level.

Further, the extension trunk 310 instructs the release of the automatical gain control to the inner amplifier when the extension trunk 310 detects that the call from the first: terminal 200 was finished, in accordance with procedures of the call processing in the control unit 330-T, and when the extension trunk 310 detects that the call at the second terminal 206, in accordance with the known signal method for the extension line.

According to this embodiment, since the correction is surely performed for the call signal which the level thereof is very large or very small caused by a mismatch of the level diagram between the public network and the private line, in accordance with the operation of a calling person, it is possible to improve the quality of call without re-calling from a sending side or a receiving side.

In this embodiment, the reception of the change request signal and the correction of the level of the call signal are performed in the extension trunk 310. In this case, if the change request signal is received as the down-call signal so that the level of the up-call signal is corrected by the down-call signal, for example, it is possible to perform the same correction as above in the trunk provided in the incoming trunk 300 and the first private branch exchange 202.

When the incoming trunk 300 corrects the level of the call signal, and the compression-coded method for the private line is applied thereto, it is possible to maintain the high quality of signal transmission by arranging the amplifier either before a coding circuit or after a decoding circuit in the incoming trunk 300.

Further, although the multi-frequency signal is used as the change request signal in this embodiment, it is possible to use the register signal applied to the signal method of the extension, the private line and the subscriber line.

Still further, in this embodiment, although the change request signal is received by the extension trunk 310, for example, when the change request signal is used as a DTMF (dual-tone multi-frequency signaling), the change request signal can be received through a register (not shown) connected in parallel to the call route.

Still further, in this embodiment, although the level of the call signal is maintained at the predetermined normal level, the present invention is not limited to the above method. For example, the level of the call signal can be increased/decreased by stage based on a predetermined value for every change request signal, or can be changed to the level indicated by the relative value or the absolute value previously corresponded to the change request signal.

The operation of the embodiment corresponding to the invention described in claim 3 is explained below with reference to FIG. 7.

In the second private branch exchange 204, the control unit 330-T generates the state information indicating that the receiving call offered by the second terminal 206 is changed to the completion call, and the control unit 330-T transmits the state information to the extension trunk 310.

When the extension trunk 310 receives the state information, it determines whether the line signal (i.e., change request signal) which indicates request of change of the up-call signal from the second terminal 206, is received or not.

Further, when the result of the decision is true, the extension trunk 310 instructs the correction of the level of the up-call signal to the inner amplifier. The amplifier automatically controls the gain, and maintains the level of the up-call signal to the predetermined normal level.

Still further, when the extension trunk 310 determines that the call from the first terminal 200 is finished, or when the extension trunk 310 detects that the call at the second terminal 206 is finished, the extension trunk 310 instructs the release of the automatical gain control of the inner amplifier.

According to this embodiment, since the correction is surely performed for the call signal which the level thereof is very large or very small caused by a mismatch of the level diagram between the public network and the private line, in accordance with the operation of a calling person, it is possible to improve the quality of call without re-calling from a sending side or a receiving side.

The operation of the embodiment corresponding to the invention described in claim 4 is explained below with reference to FIG. 7.

In this embodiment, the change request signal is applied from the second terminal 206 as the multi-frequency signal.

In the second private exchange 204, when the extension trunk 310 recognizes the change request signal (this is called "signal recognizing information"), the extension trunk 310 transmits the signal recognizing information to the control unit 330-T through the communication link.

The control unit 330-T applies the signal recognizing information to the incoming trunk 300 through the communication link.

The incoming trunk 300 instructs the correction of the level of the up-call signal to the inner amplifier when the signal recognizing information is applied thereto, and the amplifier automatically controls the gain and maintains the level of the up-call signal to the predetermined normal level.

According to this embodiment, if a receiver for the multi-frequency signal is not mounted on the incoming trunk 300, the level of the call signal is corrected by effectively utilizing a conventional communication link so that it is possible to improve the quality of call without re-calling from the sending side or the receiving side.

In this embodiment, although the extension trunk 310 receives the change request signal, the incoming trunk 300 receives the change request signal and applies the signal recognizing information to the extension trunk 310 through the control unit 330-T so that the level of the call signal is changed by the extension trunk 310.

The operation of the embodiment corresponding to the invention described in claim 5 is explained below with reference to FIG. 7.

In this embodiment, the change request signal is applied from the second terminal 206 as the line signal.

In the second private branch exchange 204, when the extension trunk 310 recognizes the change request signal, and requests transmission of the multi-frequency signal to a multi-frequency signal transmitter provided inside, the multi-frequency signal transmitter generates the multi-frequency signal, and sends it as the down-call signal.

When the incoming trunk 300 receives the multi-frequency signal through the call route formed in the switch 320-T, the incoming trunk 300 instructs correction of the level of the up-call signal to the inner amplifier. The inner amplifier automatically controls the gain and maintains the level of the up-call signal to the predetermined normal level.

According to this embodiment, regarding the deviation of the call signal, since it is possible to surely identify the change request signal which indicates the request of the correction, as the line signal (for example, hooking, dialing, etc.,) which can be transmitted based on the known signal method for the extension, it is possible to surely correct the deviation if the second terminal 206 can not transmit the multi-frequency signal.

The operation of the embodiment corresponding to the invention described in claim 6 is explained below with reference to FIG. 7.

In this embodiment, the change request signal is applied from the second terminal 206 as the line signal.

In the second private branch exchange 204, when the extension trunk 310 recognizes the change request signal as the signal recognizing information, the extension trunk 310 transmits the signal recognizing information to the control unit 330-T through the communication link.

The control unit 330-T applies the signal recognizing information to the incoming trunk 300 through the communication link.

When the incoming trunk 300 receives the signal recognizing information, the incoming trunk 300 instructs the correction of the up-call signal to the inner amplifier. The inner amplifier automatically controls the gain and maintains the level of the up-call signal to the predetermined normal level.

According to this embodiment, if an oscillator of the multi-frequency signal is not provided in the extension trunk 310, it is possible to surely correct the level of the call signal by effectively utilizing the conventional communication link so that it is possible to improve the quality of the call without re-calling from the sending side or the receiving side.

The operation of the embodiment corresponding to the invention described in claims 7 and 8 is explained below with reference to FIG. 7.

The differences in structure between the embodiment of claims 1 to 6 and the embodiment of claims 7 and 8 are as follows. That is, in this embodiment, a signal comparing unit 340 is provided in the second private branch exchange 204. The signal comparing unit 340 is connected to the incoming trunk 300 and the extension trunk 310 as shown by dotted lines. Further, a multi-frequency signal receiver (not shown) is provided in the incoming trunk 300 and the extension trunk 310.

In this drawing, the control unit 330-T corresponds to the call processing unit 11; the switch 320-T corresponds to the switch 12; and the incoming trunk 300 and the extension trunk 310 correspond to the decision units 14-1 to 14-M and 21-1 to 21-M, the variable units 15-1 to 15-N and 23-1 to 23-N, and the detection units 71-1 to 71-N and 81-1 to 81-N.

The operation of this embodiment is explained below with reference to FIG. 7.

In this embodiment, the change request signal is applied from the second terminal 206 as the multi-frequency signal.

In the second private branch exchange 204, the incoming trunk 300 and the extension trunk 310 always determines whether the change request signal is received or not through the inner multi-frequency signal receiver.

The signal comparing unit 340 determines whether the result of the decision is true. When the result is true, the signal comparing unit 340 transmits the signal recognizing information to the incoming trunk 300 and the extension trunk 310.

When the incoming trunk 300 and the extension trunk 310 recognize the signal recognizing information, these trunks instruct the correction of the level of the call signal to the inner amplifier. The inner amplifier automatically controls the gain and maintains the level of the up-call signal to the predetermined normal level.

According to this embodiment, an establishment of the call route connecting from the switch 320-T to the incoming trunk 300 and from the switch 320-T to the extension trunk 310 can be detected by only the hardware so that it is possible to surely correct the level of the call signal.

Accordingly, since the call processing steps which are performed by the control unit 330-T, are not changed, and since the level of the call signal is surely corrected, it is possible to improve the quality of call without re-calling from the sending side or the receiving side.

In this embodiment, the signal comparing unit 340 is connected between the extension trunk 310 and the incoming trunk 300. However, regarding these connections, if there are many sets of trunks to be connected through the call route, or if it is impossible to previously determine set of the trunk, it is possible to utilize a switching selector which interlocks with the call route formed in the switch 320-T, or to utilize the switching selector integrated with the switch 320-T.

The embodiment of the invention defined in claims 1 and 2 can be applied to the invention defined in claim 12, and also can be applied to the invention defined in claims 4, 7, or 8.

Further, the embodiment of the invention defined in claims 1 and 2 can be applied to the invention defined in claim 14, and also can be applied to the invention defined in claim 4.

Still further, the embodiment of the invention defined in claims 1 and 2 can be applied to the invention defined in claim 15, and also can be applied to the invention defined in claims 3 to 8, 12 and 14.

Still further, the embodiment of the invention defined in claims 1 and 2 can be applied to the invention defined in claims 17 to 19, and also can be applied to the invention defined in claims 3 to 8, 12, 14 and 15.

Figure 8:
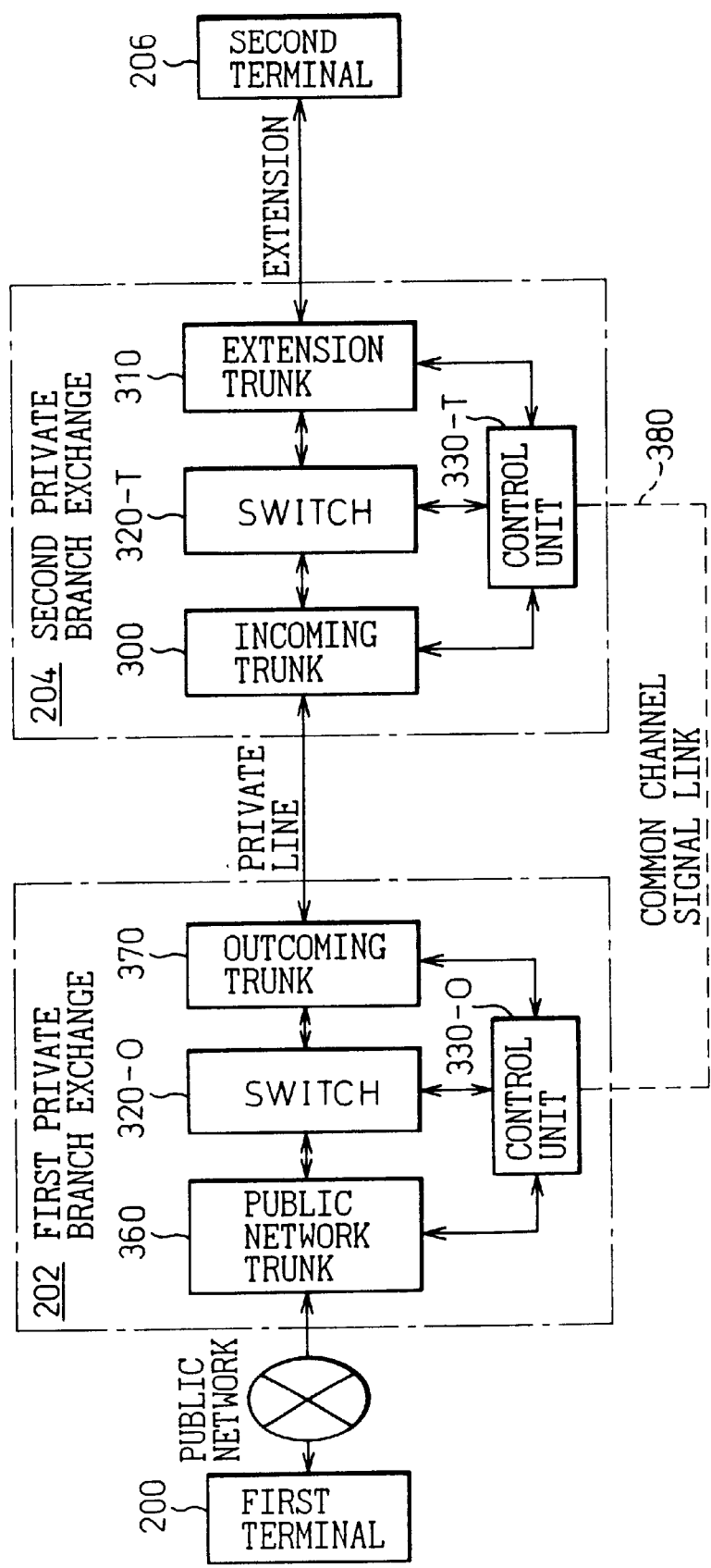
FIG. 8 is a schematic block diagram of a second embodiment according to the present invention.

FIG. 8 is a schematic block diagram of a second embodiment according to the present invention. This drawing corresponds to claims 9 to 11, 13, 16, and 20 to 22.

Although the basic structure of this embodiment is the same as the first embodiment, the structure of the first private branch exchange 202 is shown in detail in this embodiment.

In the first exchange 202, a public network trunk 360 is connected to the public network, and an outcoming trunk 370 is connected to the private line. The public network trunk 360 and the outcoming trunk 370 are connected to the switch 320-0 and the control unit 330-0. The switch 320-0 is also connected to the control unit 330-0. The control unit 330-0 is connected to the control unit 330-T through the common channel signal link 380.

The first private branch exchange 202 corresponds to the first exchanges 91 and 101 in FIGS. 4 and 5; the second private branch exchange 204 corresponds to the second exchanges 93 and 103; the incoming trunk 300, the extension trunk 310 and the control unit 330-T correspond to the signal conversion unit 95 and the signal relay unit 105 and 113, and the common channel signal link 380 corresponds to the communication link 111.

The operation of this embodiment corresponding to the invention described in claims 9, 13, 16, and 20 to 22 is explained below with reference to FIG. 8.

In the second private branch exchange 204, the control unit 330-T generates the state information indicating that the incoming call generated in the second terminal 206 is changed to the completion call, and transmits the state information to the extension trunk 310.

When the extension trunk 310 receives the state information, the extension trunk 310 supervises the down-call signal transmitted from the second terminal 206, and determines whether the down-call signal is the line signal indicating the request of the change of the level of the up-call signal (i.e., change request signal).

When the result of the decision is true, the extension trunk 310 transmits the signal recognizing information to the control unit 330-T through the communication link.

The control unit 330-T applies the signal recognizing information to the incoming trunk 300 through the communication link.

When the incoming trunk 300 receives signal recognizing information, the incoming trunk 300 requests transmission of the multi-frequency signal to an inner multi-frequency signal transmitter. The multi-frequency signal transmitter generates the multi-frequency signal and transmits the multi-frequency signal as the down-call signal.

On the other hand, in the first private branch exchange 202, when the outcoming trunk 370 recognizes the above completion call based on the call processing steps performed by the control unit 330-0, the outcoming trunk 370 determines whether the multi-frequency signal is received or not through the private line. Further, the outcoming trunk 370 instructs correction of the level of the up-call signal to the inner amplifier when the result of decision is truth. The inner amplifier automatically controls the gain and maintains the level of the up-call signal to the predetermined normal level.

According to this embodiment, since the deviation of the level of the call signal caused by a mismatch of the level diagram between the public network and the private line, is surely corrected, and since the change request signal indicating the request of the correction is surely identified as the multi-frequency signal which can transmit through the private line, it is possible to surely apply the present invention if the second terminal 206 cannot send the multi-frequency signal.

In this embodiment, although the level of the call signal is corrected in the outcoming trunk 370, it is possible to correct the level of the call signal in the public network trunk 360 if the amplifier, which receives the multi-frequency signal and changing the level of the call signal, is provided.

In this embodiment, although the multi-frequency signal is generated by the multi-frequency signal transmitter provided within the incoming trunk 300, the present invention is not limited by this structure. For example, the multi-frequency signal transmitter may be provided within the extension trunk 310.

Further, although the change request signal is converted to the multi-frequency signal and applied to the first private branch exchange 202, the present invention is not limited by this structure. For example, the multi-frequency signal can be applied as the DTMF signal and received through the register connected to the call route.

In this embodiment, although the level of the call signal is corrected by the amplifier provided within the outcoming trunk 370, when the compressed-coding method is applied to the private line, and when the amplifier is provided for both or any one of a stage preceding to the coding stage and a stage following to the decoding stage, it is possible to maintain high quality of transmission.

Still further, in this embodiment, although the level of the call signal is maintained in the predetermined normal level, the present invention is not limited by this method. For example, the level of the call signal may be increased/decreased by stages based on the predetermined value for every change request signal, or the level of the call signal may be changed to the level indicated by the absolute value or the relative value previously corresponded to the change request signal.

The operation of the embodiment corresponding to the invention described in claim 10 is explained below with reference to FIG. 8.

In this embodiment, the change request signal is applied from the second terminal 206 as the line signal.

In the second private branch exchange 204, when the extension trunk 310 recognizes the change request signal, the extension trunk 310 transmits the signal recognizing information to the control unit 330-T through the communication link. The control unit 330-T applies the signal recognizing information to the incoming trunk 300 through the communication link.

When the incoming trunk 300 receives the signal recognizing information, the incoming trunk 300 converts the signal recognizing information to the line signal adapted to the signal method of the private line, and transmits it to the private line.

In the first private branch exchange 202, when the outcoming trunk 370 recognizes the completion call based on the call processing steps performed by the control unit 330-0, the outcoming trunk 370 determines whether the line signal is received or not through the private line. Further, when the result of the decision is true, the outcoming trunk 370 instructs the correction of the level of the up-call signal to the inner amplifier. The amplifier automatically control the gain, and maintains the level of the up-call signal to the predetermined normal level.

According to this embodiment, if the multi-frequency signal transmitter is not provided in the incoming trunk 300, it is possible to surely correct the level of the call signal by effectively utilizing the conventional line signal so that it is possible to improve the quality of signal transmission without re-calling from the sending side or the receiving side.

In this embodiment, although the correction of the level of the call signal is performed in the outcoming trunk 370, the present invention is not limited by this structure. For example, when the line signal is received by the outcoming trunk 370, it is possible to correct the level of the call signal in the public network trunk 360 either by transmitting the multi-frequency signal generated by the multi-frequency signal transmitter to the public network trunk 360 through the call route formed in the switch 320-0, or by sending the reception information of the line signal to the public network trunk 360 through the control unit 330-0.

The operation of the embodiment corresponding to the invention described in claim 11 is explained below with reference to FIG. 8.

In this embodiment, the change request signal is applied from the second terminal 206 as the line signal.

In the second private branch exchange 204, when the extension trunk 310 recognizes the change request signal, the extension trunk 310 transmits the signal recognizing information to the control unit 330-T through the communication link.

The control unit 330-T transmits the signal recognizing information to the common channel signal link 380 connecting between the first exchange 202 and the second exchange 204.

In the first private branch exchange 202, when the control unit 330-0 recognizes the completion call based on the call processing steps, the control unit 330-0 determines whether the signal recognizing information is received or not through the common channel signal link 380. Further, when the result of the decision is true, the control unit 330-0 sends the signal recognizing information to the public network trunk 360 or the outcoming trunk 370 through the communication link.

When the public network trunk 360 or the outcoming trunk 370 receives the signal recognizing information, it instructs the correction of the level of the up-call signal to the inner amplifier. The amplifier automatically control the gain, and maintains the level of the up-call signal to the predetermined normal level.

Further, when the control unit 330-0 recognizes the end of the call at the first exchange 200 or the second terminal 206 based on the call processing steps, the control unit 330-0 instructs the release of the automatical control of the gain to the above amplifier.

According to this embodiment, if the multi-frequency signal transmitter is not provided in the incoming trunk 300, it is possible to surely correct the level of the call signal by effectively utilizing the common channel signal method so that it is possible to improve the quality of signal transmission without re-calling from the sending side or the receiving side.

The embodiment corresponding to the invention defined in claim 9 can be applied to the invention defined in claim 16, and also can be applied to the invention defined in claims 10, 11, and 13.

Further, the embodiment corresponding to the invention defined in claim 9 can be applied to the invention defined in claims 20 to 22, and also can be applied to the invention defined in claims 10, 11, 13, and 16.

Still further, in above mentioned embodiments, although the change request signal is received in each trunk, the present invention is not limited by this method. That is, if the change request signal is surely coupled with the signal line, and the signal method applied to the signal line is applied normally, it is possible to utilize a hardware separated from the trunk.

Figure 9:
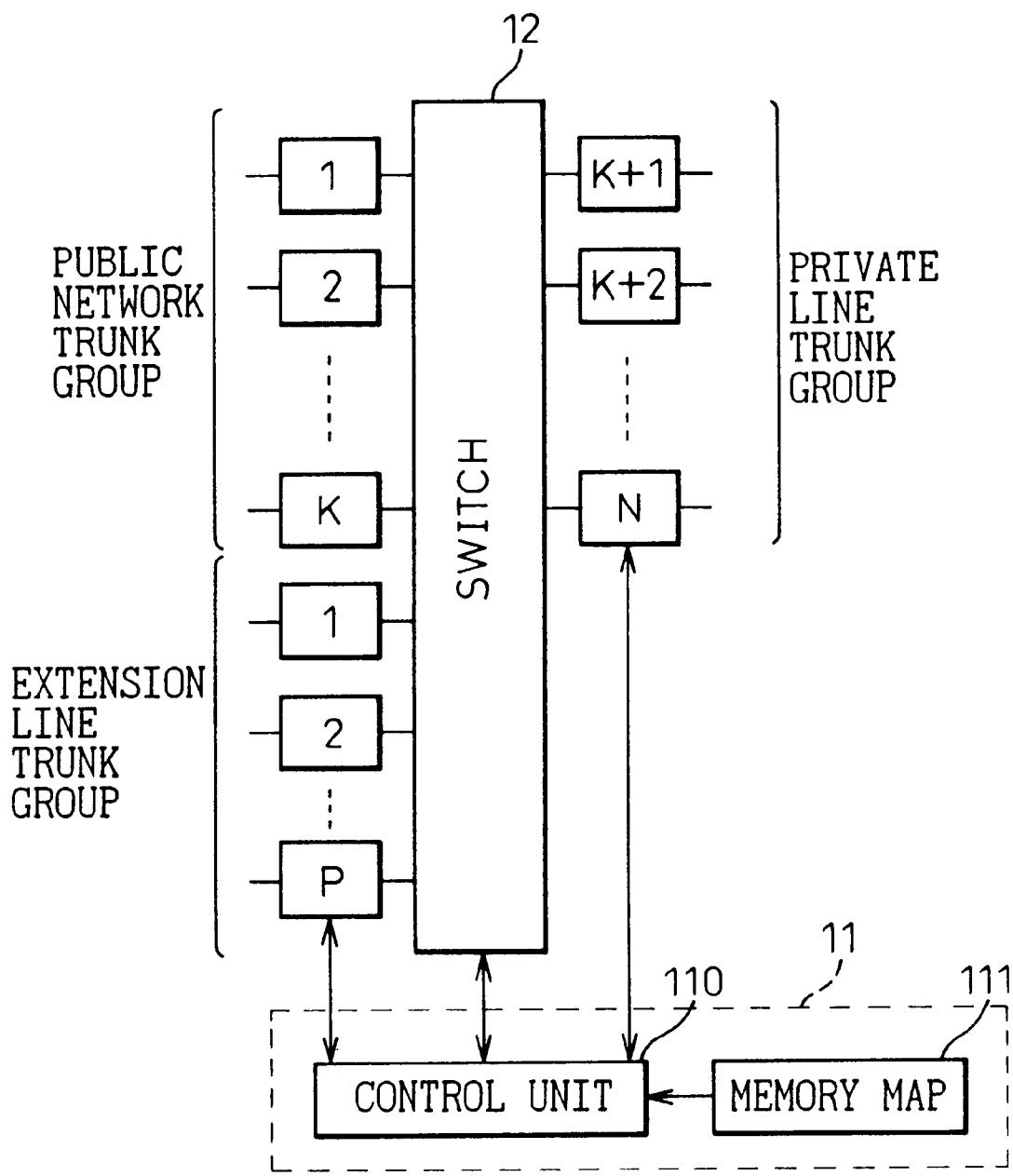
FIG. 9 shows basic connection relationship among public network trunks, extension line trunks and private line trunks through the switch.

FIG. 9 shows a basic connection relationship among public network trunks, extension trunks and private line trunks through the switch. This drawing corresponds to the trunks shown in FIGS. 3 and 6.

In FIG. 9, 1 to K are the public network trunk group, 1 to P are the extension trunk group, and K+1 to N are the private trunk group. A control unit 110 and memory map 111 are included in the call processing unit 11. The control unit 110 is connected to these trunks as shown in FIGS. 3 and 6. Further, the control unit 110 reads connection data from the memory map 111.

Figure 10:
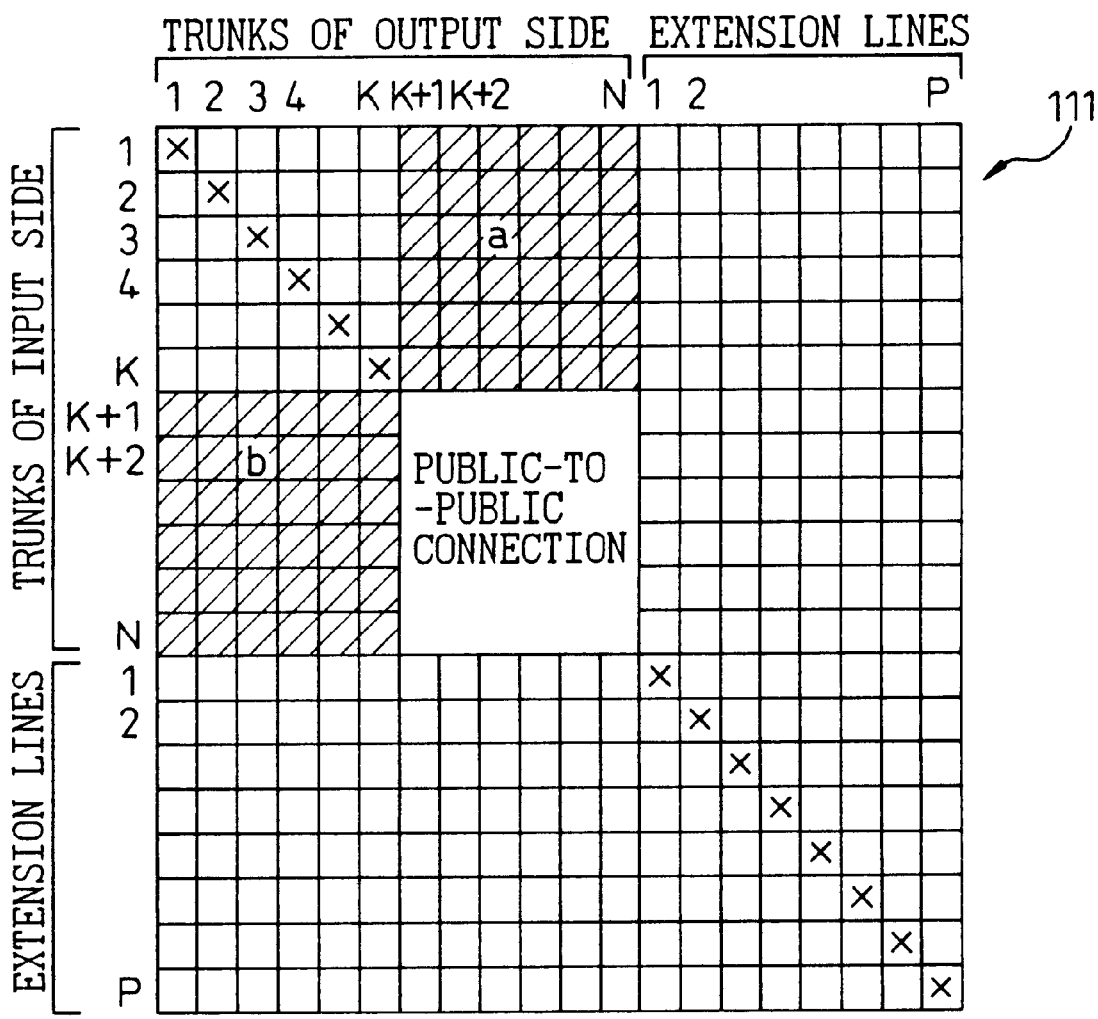
FIG. 10 shows contents of a map stored in a memory shown in FIG. 9.

The contents of the memory map are shown in detail in FIG. 10.

FIG. 10 shows contents of a map stored in a memory shown in FIG. 9. In FIG. 10, 1 to K represent the public network trunks, and K+1 to N represent the private line trunks. Further, 1 to P represent the extension lines. In the map, the ordinate denotes the trunks of the input side, and abscissa denotes the trunks of the output side. The extension lines are provided for both of the input/output sides. The center of the map denotes the public-to-public connection, and slanted portions denote the public-to-private connection. Function, "X" denotes the position which cannot connect the line.

For example, when a sending call occurs at the public network, and an incoming call occurs in the private line, the steps are shown as follows.

When any one of public network trunks is started in the input side, the control unit 110 starts in order to find a vacant trunk in accordance with a call setting information (i.e., register information).

When the vacant trunk is found, the private line trunk is started in the output side, and the position is marked on the memory map 111 (see "a" on the memory map).

Finally, the channel, which is started in the trunk of the private side, is set to waiting state of the level control.

Further, for example, when a sending call occurs at the private line, and an incoming call occurs in the public network, the steps are shown as follows.

When any one of private line trunks is started in the input side, the control unit 110 starts in order to find a vacant trunk in accordance with a call setting information (i.e., register information).

When the vacant trunk is found, the private line trunk is started in the output side, and the position is marked on the memory map 111 (see "b" on the memory map).

Finally, the channel, which is started in the trunk of the public network side, is set to waiting state of the level control.

Figure 11:
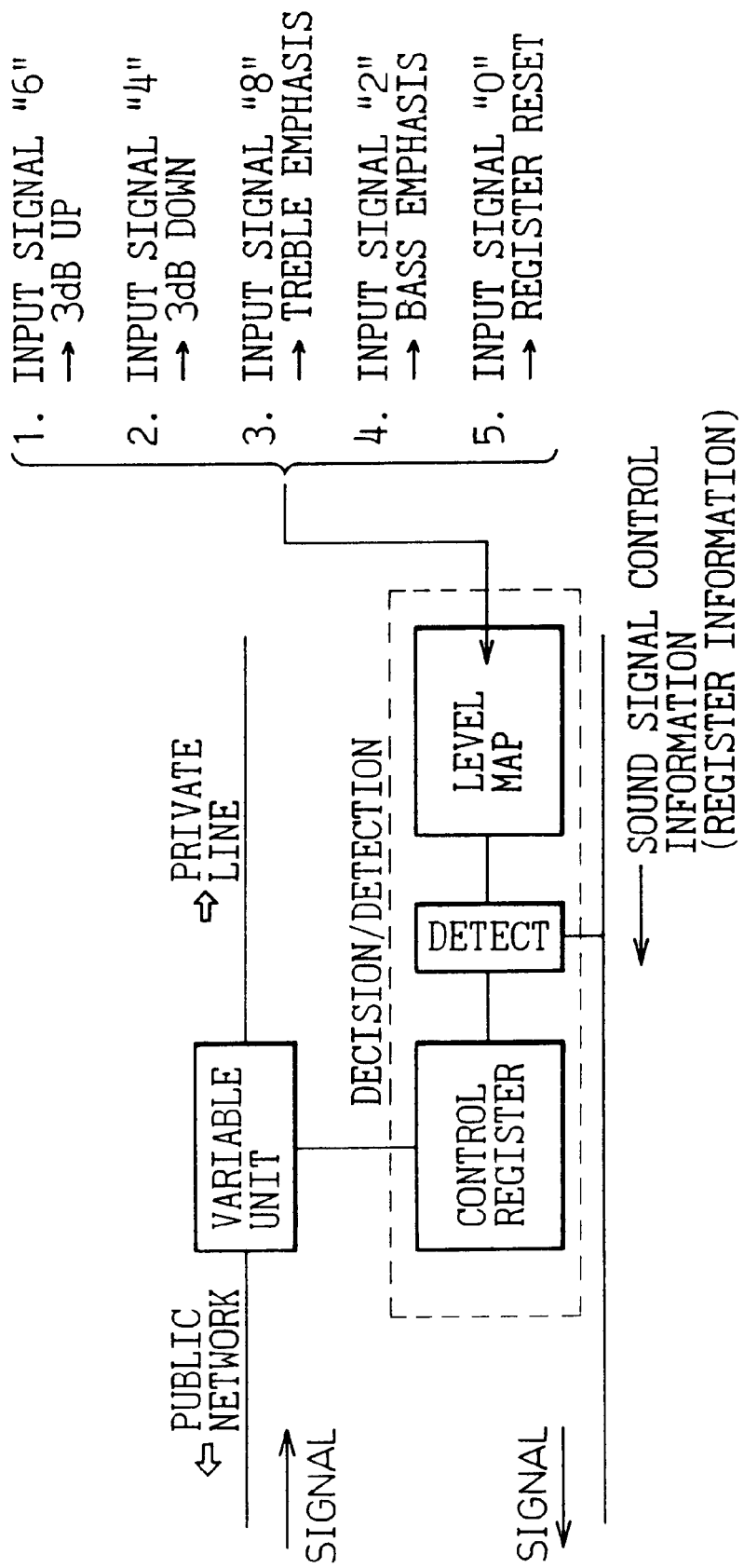
FIG. 11 is a view for explaining sound signal control information stored in a memory.

FIG. 11 is a view for explaining sound signal control information stored in a memory.

As shown in the drawing, a level map stores a table indicating a relationship between control information and sound signal information (i.e., input signal). That is, in this example, when the input signal is "6", the level is set to "3 dB up". Similarly, when the input signal is "4", the level is set to "3 dB down". When the input signal is "8", a treble is emphasized. When the input signal is "2", a bass is emphasized. When the input signal is "0", the register is reset.

When the control information (i.e., input signal) is detected, the level map is searched in order to find the suitable sound signal information. When the sound signal information is found, this information is sent to the control register and written therein. An output of the control register is sent to the variable unit in order to change the level of the call signal.

Figure 12:
FIG. 12 is a view for explaining a line signal.

FIG. 12 is a view for explaining a line signal. As explained before, the line signal can be used instead of the audio frequency signal for applying the level change information. In this example, the line signal is provided in another area of the sound information 1 to N and the call setting information.

Figure 13:
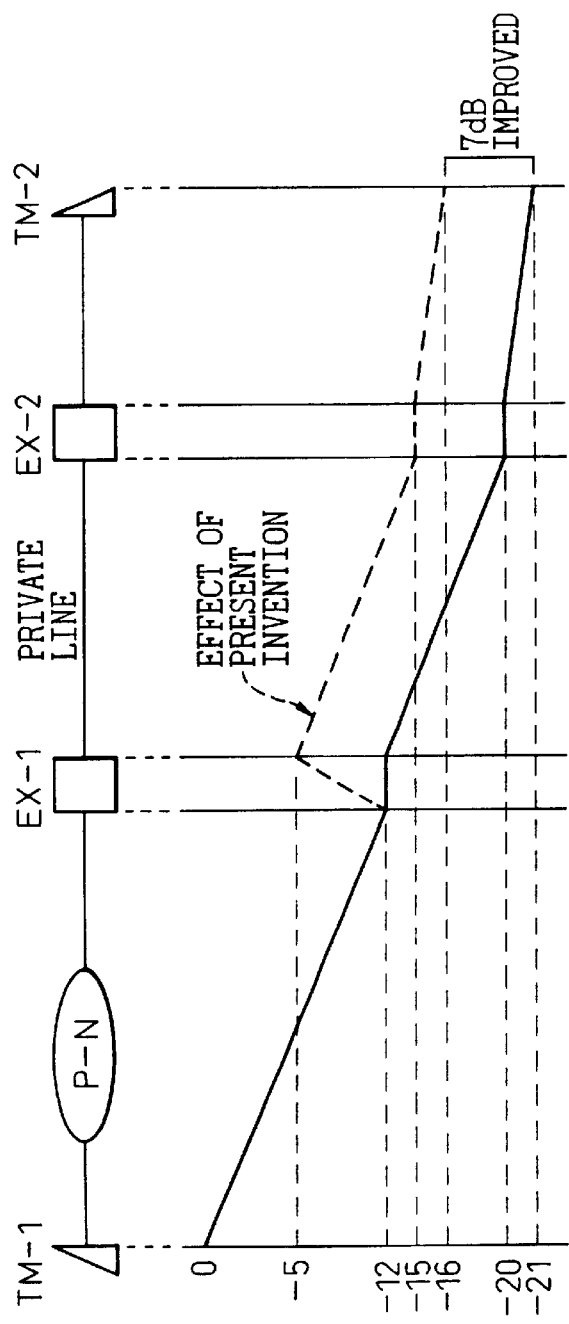
FIGS. 13 and 14 show level diagrams in the public network and private line.
Figure 14:
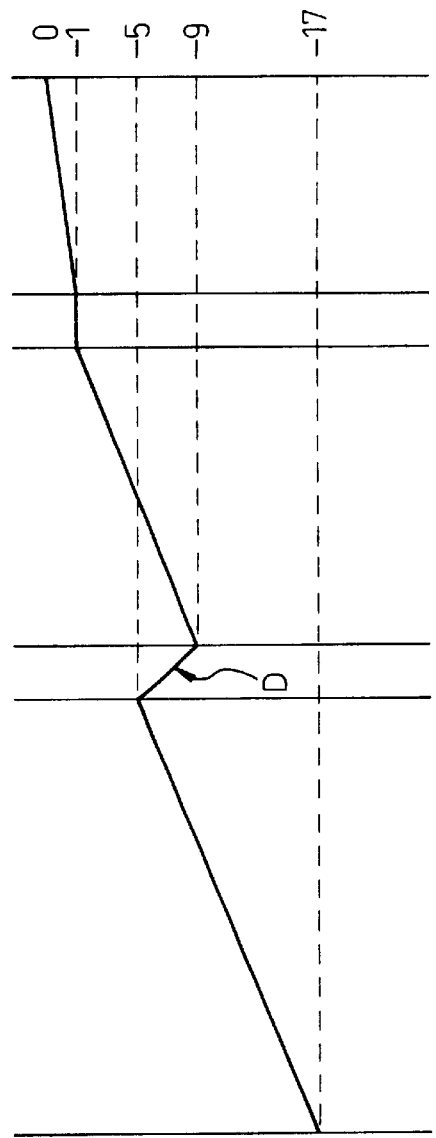

FIGS. 13 and 14 show level diagrams in the public network and private line. In the drawing, TM-1 denotes the first terminal, P-N denotes the public network, EX-1 denotes the first private branch exchange, EX-2 denotes the second private branch exchange, and TM-2 denotes the second terminal.

In the case of FIG. 13, the call signal (or sound level) is transmitted from the first terminal. As shown by the solid line, the level of the call signal is gradually falls in the public network and the private line between the TM-1 and the TM-2. According to the present invention, as shown by the dotted line, the level of the call signal can be improved by about 7 dB in the first exchange EX-1. Accordingly, it is possible to improve the quality of the call.

In the case of FIG. 14, the call signal is transmitted from the second terminal. In this case, the level of the call signal is already raised in the EX-1 just before the call signal is input to the public network. Normally, the level of the call signal is raised by 3 to 4 dB (see "D") in accordance with a predetermined regulation in the public network. That is, in general, when the call signal is sent from the exchange to the public network, the level is forcedly raised as shown by D in FIG. 14. However, when the call signal is sent from the terminal to the public network, the level is not raised so that it is necessary to raise the level of the call signal in the exchange as shown in FIG. 13.

What is claimed is:

1. An exchange, comprising:
a call processing means for processing a call occurring at any one of plural subscriber lines, a main line, or a private line, selecting a communication route, identifying a completion call, and determining a call route used for transmitting a call signal;
a switch means for establishing the call route determined by the call processing means; and
a plurality of trunks for separately connecting to any one of plural subscriber lines, a main line, or a private line, interfacing with the call route for the call signal, and having a matching between the call processing and a predetermined signal method used in any one of plural subscriber lines, a main line, or a private line,
said exchange being connected between a public network and a private line for controlling sound level from the public network, and further comprising:
a single or plural decision means for determining for a call's duration whether an audio frequency signal which separately indicates a state of change of level of the call signal, is received or not, in the route formed by all or any one of plural subscriber lines, a main line, or a private line; and
a single or plural variable means separately provided between each of routes and a corresponding port of the switch, and performing a change of the level based on a state indicated by the audio frequency signal which gives a result of decision by the decision means, for the level of the call signal transmitted toward the route in which the result of the decision is true.

2. An exchange, comprising:
a call processing means for processing a call occurring at any one of plural subscriber lines, a main line, or a private line, selecting a communication route, identifying a completion call, and determining a call route used for transmitting a call signal;
a switch means for establishing the call route determined by the call processing means; and
a plurality of trunks for separately connecting to any one of plural subscriber lines, a main line, or a private line, interfacing with the call route for the call signal, and having a matching between the call processing and a predetermined signal method used in any one of plural subscriber lines, a main line, or a private line,
said exchange being connected between a public network and a private line for controlling sound level from the public network, and further comprising:
a single or plural decision means for determining for a call's duration whether an audio frequency signal which separately indicates a state of change of level of the call signal, is received or not, through the call route formed by said switch means, in the call route formed by all or any one of plural subscriber lines, a main line, or a private line; and
a single or plural variable means separately provided between each of opposite routes, which corresponds to the selected route based on selection of the route, and a corresponding port of the switch, and performing a change of the level based on the state indicated by the audio frequency signal which gives a result of decision by the decision means, for the level of the call signal transmitted toward the route in which the result of the decision is true.

3. An exchange, comprising:
a call processing means for processing a call occurring at any one of plural subscriber lines, a main line, or a private line, selecting a communication route, identifying a completion call, and determining a call route used for transmitting a call signal;
a switch means for establishing the call route determined by the call processing means; and
a plurality of trunks for separately connecting to any one of plural subscriber lines, a main line, or a private line, interfacing with the call route for the call signal, and having a matching between the call processing and a predetermined signal method used in any one of plural subscriber lines, a main line, or a private line,
said exchange being connected between a public network and a private line for controlling sound level from the public, network, and further comprising:
a single or plural decision means for determining for a call's duration whether a separate line signal which separately indicates a state of change of level of the call signal, is received or not, in the route formed by all or any one of plural subscriber lines, a main line, or a private line; and
a single or plural variable means separately provided between each of routes and a corresponding port of the switch, and performing a change of the level based on a the state indicated by the line signal which gives a result of decision by the decision means, for the level of the call signal transmitted toward the route in which the result of the decision is true.

4. An exchange, comprising:
a call processing means for processing a call occurring at any one of plural subscriber lines, a main line, or a private line, selecting a communication route, identifying a completion call, and determining a call route used for transmitting a call signal;
a switch means for establishing the call route determined by the call processing means; and
a plurality of trunks for separately connecting to any one of plural subscriber lines, a main line, or a private line, interfacing with the call route for the call signal, and having a matching between the call processing and a predetermined signal method used in any one of plural subscriber lines, a main line, or a private line, said exchange being connected between a public network and a private line for controlling sound level from the public network, and further comprising:
- a single or plural decision means for determining for a call's duration whether a separate audio frequency signal which separately indicates a state of change of level of the call signal, is received or not, in the route formed by all or any one of plural subscriber lines, a main line, or a private line; and
- a single or plural variable means separately provided between each of opposite routes, which corresponds to the selected route based on selection of the route, and a corresponding port of the switch, and performing the change of the level based on a predetermined state, for the level of the call signal transmitted toward the route through the port;
- wherein the call processing means further includes means for giving the state to the variable means corresponding to the opposite route based on selection of the route, within a single or plural variable means, when the result of decision performed by a single or plural variable means is true.

5. An exchange, comprising:
a call processing for processing a call occurring at any one of plural subscriber lines, a main line, or a private line, selecting a communication route, identifying a completion call, and determining a call route used for transmitting a call signal;
a switch means for establishing the call route determined by the call processing means; and
a plurality of trunks for separately connecting to any one of plural subscriber lines, a main line, or a private line, interfacing with the call route for the call signal, and having a matching between the call processing and a predetermined signal method used in any one of plural subscriber lines, a main line, or a private line,
said exchange being connected between a public network and a private line for controlling sound level from the public network, and further comprising:
- a single or plural decision means for determining for a call's duration whether a separate signal which separately indicates a state of change of level of the call signal, is received or not, in the route formed by all or any one of plural subscriber lines, a main line, or a private line, converting a line signal to an audio frequency signal, and transmitting the converted audio frequency signal to the call route; and
- a single or plural variable means separately provided between each of opposite routes, which can correspond to all routes based on selection of the route, and a corresponding port of the switch, and performing the change of the level based on the state indicated by the audio frequency signal, for the level of the call signal transmitted toward the route through the port.

6. An exchange, comprising:
a call processing means for processing a call occurring at any one of plural subscriber lines, a main line, or a private line, selecting a communication route, identifying a completion call, and determining a call route used for transmitting a call signal;
a switch means for establishing the call route determined by the call processing means; and
a plurality of trunks for separately connecting to any one of plural subscriber lines, a main line, or a private line, interfacing with the call route for the call signal, and having a matching between the call processing and a predetermined signal method used in any one of plural subscriber lines, a main line, or a private line,
said exchange being connected between a public network and a private line for controlling sound level from the public network and further comprising:
- a single or plural decision means for determining for a call's duration whether a separate line signal which separately indicates a state of change of level of the call signal, is received or not, in the route formed by all or any one of plural subscriber lines, a main line, or a private line; and
- a single or plural variable means separately provided between each of opposite routes, which can correspond to all routes based on selection of the route, and a corresponding port of the switch, and performing the change of the level based on a predetermined state, for the level of the call signal transmitted toward the route formed by the switch;
- wherein the call processing means further includes means for giving the result of decision, which is performed by the decision means, and the state to the variable means corresponding to the opposite route based on selection of the route, within a single or plural variable means.

7. An exchange as claimed in claim 1, further comprising a single or plural detecting means provided separately corresponding to the opposite route which can correspond to all routes through the call route based on selection of the route, and performing whether the audio frequency signal is received or not through the call route formed by the switch and the trunk connected to each route;
wherein a single or plural variable means further comprises means for limiting the change when the result of decision performed by the detecting means which is provided to the opposite route based on selection of the route, within a single or plural detecting means.

8. An exchange as claimed in claim 2, further comprising a single or plural detecting means provided separately corresponding to the route, and performing whether the audio frequency signal is received or not through the route;
wherein a single or plural variable means further comprises means for limiting the change when the result of decision performed by the detecting means which is provided to the route corresponding to the opposite route having the variable means, under selection of the route, within a single or plural detecting means.

9. An exchange system including the exchange defined in claim 1, 2 or 4, comprising:
the above exchange being used as a first exchange; and
a second exchange connected to the first exchange through a relay line which corresponds to the main line or the private line, and exchanging the call on the relay line used as an incoming route or an outcoming route;
wherein the second exchange further comprises a signal conversion means for indicating the state of the change for the level of the call signal to be transmitted toward any one of the subscriber lines, the main line, or the private line, connected to its own exchange, supervising the line signal transmitted from any one of the subscriber lines, the main line, or the private line, converting the line signal to the audio frequency signal and transmitting the audio frequency signal to the relay line.

10. An exchange system including the exchange defined in claim 3, 5, or 6, comprising:

the above exchange being used as a first exchange; and
a second exchange connected to the first exchange through a relay line which corresponds to the main line or the private line, and exchanging the call on the relay line used as an incoming route or an outcoming route;
wherein the second exchange further comprises a signal relay means for indicating the state of the change for the level of the call signal to be transmitted toward any one of the subscriber lines, the main line, or the private line, connected to its own exchange, supervising the line signal transmitted from any one of the subscriber lines, the main line, or the private line, and relaying the line signal to the first exchange through the relay line.

11. An exchange system including the exchange defined in claim 3, 5, or 6 comprising:
the above exchange being used as a first exchange;
a second exchange connected to the first exchange through a relay line which corresponds to the main line or the private line, and exchanging the call on the relay line used as an incoming route or an outcoming route; and
a communication link provided between the first exchange and the second exchange, and employing a common channel signalling as a communication method;
wherein the second exchange further comprises a signal relay means for indicating the state of the change for the level of the call signal to be transmitted toward any one of the subscriber lines, the main line, or the private line, connected to its own exchange, supervising the line signal transmitted from any one of the subscriber lines, the main line, or the private line, and relaying the line signal with an identifying information which-indicates the relay line, through the communication link;
wherein the call processing means in the first exchange further comprises means for applying the line signal with the identifying information to the decision means which correspond to the identifying information applied with the line signal through the communication link within a plurality of decision means.

12. An exchange as claimed in claim 1, 2, or 4, wherein the audio frequency signal is a line signal adapted to a signal method which is employed in any one of the subscriber lines, the main line, or the private line.

13. An exchange system as claimed in claim 9, wherein the audio frequency is a register signal adapted to a signal method which is employed in any one of the subscriber lines, the main line, or the private line.

14. An exchange as claimed in claim 1, 2, or 4, wherein the audio frequency is a register signal adapted to a signal method which is employed in any one of the subscriber lines, the main line, or the private line;
the decision means is a single or a plurality of registers, each separately connected to the port of the switch, receiving the register signal supplied through the call route formed in the switch, and sending an information indicated by the register signal to the call processing means:
the call processing means includes means for detecting a vacant register within a single or plural registers when determining the call route, and requesting connection to the register and the call route to the switch; and
the switch includes means for connecting the register and the call route in accordance with the request.

15. An exchange as claimed in any one of claims 1 to 6, wherein a compressed-coding transmission method is applied to the main line or the private line; and
the variable means performs the change of the level of the call signal before coding, or after decoding, based on the compressed-coding transmission method.

16. An exchange as claimed in claim 12, wherein a compressed-coding transmission method is applied to the main line or the private line; and
the variable means performs the change of the level of the call signal before coding, or after decoding, based on the compressed-coding transmission method.

17. An exchange as claimed in claim 14, wherein a compressed-coding transmission method is applied to the main line or the private line; and
the variable means performs the change of the level of the call signal before coding, or after decoding, based on the compressed-coding transmission method.

18. An exchange system as claimed in claim 9, wherein a compressed-coding transmission method is applied to the main line or the private line; and
the variable means performs the change of the level of the call signal before coding, or after decoding, based on the compressed-coding transmission method.

19. An exchange system as claimed in claim 10, wherein a compressed-coding transmission method is applied to the main line or the private line; and
the variable means performs the change of the level of the call signal before coding, or after decoding, based on the compressed-coding transmission method.

20. An exchange system as claimed in claim 11, wherein a compressed-coding transmission method is applied to the main line or the private line; and
the variable means performs the change of the level of the call signal before coding, or after decoding, based on the compressed-coding transmission method.

21. An exchange system as claimed in claim 13, wherein a compressed-coding transmission method is applied to the main line or the private line; and
the variable means performs the change of the level of the call signal before coding, or after decoding, based on the compressed-coding transmission method.

22. An exchange as claimed in any one of claims 1 to 8, wherein the audio frequency signal or the line signal indicate the state changing the level of the call signal by stage in accordance with the audio frequency signal or the line signal.

23. An exchange as claimed in claim 12, wherein the audio frequency signal or the line signal indicate the state changing the level of the call signal by stage in accordance with the audio frequency signal or the line signal.

24. An exchange as claimed in claim wherein the audio frequency signal or the line signal indicate the state changing the level of the call signal by stage in accordance with the audio frequency signal or the line signal.

25. An exchange as claimed in claim 15, wherein the audio frequency signal or the line signal indicate the state changing the level of the call signal by stage in accordance with the audio frequency signal or the line signal.

26. An exchange as claimed in any one of claims 1 to 8, wherein the audio frequency signal or the line signal indicate the state changing the level of the call signal based on a relative value indicated by the audio frequency signal or the line signal.

27. An exchange as claimed in claim 12, wherein the audio frequency signal or the line signal indicate the state changing the level of the call signal based on a relative value indicated by the audio frequency signal or the line signal.

28. An exchange as claimed in claim 14, wherein the audio frequency signal or the line signal indicate the state changing the level of the call signal based on a relative value indicated by the audio frequency signal or the line signal.

29. An exchange as claimed in claim 15, wherein the audio frequency signal or the line signal indicate the state changing the level of the call signal based on a relative value indicated by the audio frequency signal or the line signal.

30. An exchange as claimed in any one of claims 1 to 8, wherein the audio frequency signal or the line signal indicate the state setting the level of the call signal to an absolute value indicated by the audio frequency signal or the line signal.

31. An exchange as claimed in claim 12, wherein the audio frequency signal or the line signal indicate the state setting the level of the call signal to an absolute value indicated by the audio frequency signal or the line signal.

32. An exchange as claimed in claim 14, wherein the audio frequency signal or the line signal indicate the state setting the level of the call signal to an absolute value indicated by the audio frequency signal or the line signal.

33. An exchange as claimed in claim 15, wherein the audio frequency signal or the line signal indicate the state setting the level of the call signal to an absolute value indicated by the audio frequency signal or the line signal.

34. An exchange system as claimed in claim 9, wherein the audio frequency signal or the line signal indicate the state changing the level of the call signal by stage in accordance with the audio frequency signal or the line signal.

35. An exchange system as claimed in claim 10, wherein the audio frequency signal or the line signal indicate the state changing the level of the call signal by stage in accordance with the audio frequency signal or the line signal.

36. An exchange system as claimed in claim 11, wherein the audio frequency signal or the line signal indicate the state changing the level of the call signal by stage in accordance with the audio frequency signal or the line signal.

37. An exchange system as claimed in claim 13, wherein the audio frequency signal or the line signal indicate the state changing the level of the call signal by stage in accordance with the audio frequency signal or the line signal.

38. An exchange system as claimed in claim 16, wherein the audio frequency signal or the line signal indicate the state changing the level of the call signal by stage in accordance with the audio frequency signal or the line signal.

39. An exchange system as claimed in claim 9, wherein the audio frequency signal or the line signal indicate the state changing the level of the call signal based on a relative value indicated by the audio frequency signal or the line signal.

40. An exchange system as claimed in claim 10, wherein the audio frequency signal or the line signal indicate the state changing the level of the call signal based on a relative value indicated by the audio frequency signal or the line signal.

41. An exchange system as claimed in claim 11, wherein the audio frequency signal or the line signal indicate the state changing the level of the call signal based on a relative value indicated by the audio frequency signal or the line signal.

42. An exchange system as claimed in claim 13, wherein the audio frequency signal or the line signal indicate the state changing the level of the call signal based on a relative value indicated by the audio frequency signal or the line signal.

43. An exchange system as claimed in claim 16, wherein the audio frequency signal or the line signal indicate the state changing the level of the call signal based on a relative value indicated by the audio frequency signal or the line signal.

44. An exchange system as claimed in claim 9, wherein the audio frequency signal or the line signal indicate the state setting the level of the call signal to an absolute value indicated by the audio frequency signal or the line signal.

45. An exchange system as claimed in claim 10, wherein the audio frequency signal or the line signal indicate the state setting the level of the call signal to an absolute value indicated by the audio frequency signal or the line signal.

46. An exchange system as claimed in claim 11, wherein the audio frequency signal or the line signal indicate the state setting the level of the call signal to an absolute value indicated by the audio frequency signal or the line signal.

47. An exchange system as claimed in claim 13, wherein the audio frequency signal or the line signal indicate the state setting the level of the call signal to an absolute value indicated by the audio frequency signal or the line signal.

48. An exchange system as claimed in claim 16, wherein the audio frequency signal or the line signal indicate the state setting the level of the call signal to an absolute value indicated by the audio frequency signal or the line signal.

49. A method for operating an exchange connected between a public network and a private line, comprising the steps of:
  providing a call processing means for processing a call occurring at any one of plural subscriber lines, a main line, or a private line, selecting a communication route, identifying a completion call, and determining a call route used for transmitting a call signal;
  establishing the call route determined by the call processing means by using a switch means;
  separately connecting to any one of plural subscriber lines, a main line, or a private line, using a plurality of trunks, interfacing with the call route for the call signal, and matching between the call processing and a predetermined signal method used in any one of said plural subscriber lines, a main line, or a private line
  using a single or plural decision means and determining for a call's duration whether a separate audio frequency signal which separately indicates a state of change of level of the call signal, is received or not, in the route formed by all or any one of said plural subscriber lines, a main line, or a private line; and
  providing a single or plural variable means separately between said call route and a corresponding port of the switch, and performing a change of the said level based on a state indicated by the audio frequency signal, said state giving a result of decision by the decision means for the level of the call signal transmitted toward the route in which the result of the decision is true.

* * * * *